United States Patent

Walsh et al.

[11] Patent Number: 5,642,410
[45] Date of Patent: Jun. 24, 1997

[54] CALL PROCESSOR FOR A COMPUTER TELEPHONE INTEGRATION SYSTEM

[75] Inventors: Maryann P. Walsh, Chelmsford; Paul M. Gasparro, Sudbury, both of Mass.

[73] Assignee: Aurora Systems, Inc., Acton, Mass.

[21] Appl. No.: 616,956

[22] Filed: Mar. 15, 1996

Related U.S. Application Data

[63] Continuation of Ser. No. 490,325, Jun. 14, 1995, abandoned, which is a continuation of Ser. No. 198,821, Feb. 18, 1994, abandoned.

[51] Int. Cl.$^6$ .................................................. H04M 3/42
[52] U.S. Cl. ........................... 379/201; 379/112; 379/127; 379/128; 379/211
[58] Field of Search ........................ 379/67, 88, 89, 379/94, 96, 201, 202, 203, 204, 205, 206, 207, 211, 212, 112, 127, 128, 130, 131, 132, 91, 95, 214, 265, 266, 309, 142, 213, 245, 136, 198

[56] References Cited

U.S. PATENT DOCUMENTS

| | | | |
|---|---|---|---|
| 4,878,240 | 10/1989 | Lin et al. ............................ | 379/67 |
| 5,001,710 | 3/1991 | Gawrys et al. ....................... | 379/96 |
| 5,008,930 | 4/1991 | Gawrys et al. ....................... | 379/210 |
| 5,012,512 | 4/1991 | Basso et al. .......................... | 379/265 |
| 5,023,868 | 6/1991 | Davidson et al. .................... | 379/211 |
| 5,097,528 | 3/1992 | Gursahaney et al. ................. | 379/92 |
| 5,101,425 | 3/1992 | Darland et al. ....................... | 379/265 |
| 5,181,239 | 1/1993 | Jolissaint ............................... | 379/265 |
| 5,200,993 | 4/1993 | Wheeler et al. ...................... | 379/96 |
| 5,210,789 | 5/1993 | Jeffus et al. .......................... | 379/127 |
| 5,241,588 | 8/1993 | Babson, III et al. ................. | 379/127 |

*Primary Examiner*—Thomas W. Brown
*Assistant Examiner*—Scott Wolinsky
*Attorney, Agent, or Firm*—Wolf, Greenfield & Sacks, P.C.

[57] ABSTRACT

A rule-based computer-telephone integration system including a telephone system for transmitting call information, a computer in communication with the telephone system including a plurality of application programs having data retrievable in response to call information transmitted by the telephone system, and a call processor operable on the computer including routines for uniformly establishing precedential rules for retrieving the application program data based on call information and for automatically executing the established precedential rules in response to transmitted call information.

34 Claims, 30 Drawing Sheets

|  | CALLING NUMBER LIST |  |
|---|---|---|
| DESCRIPTION | NUMBER | |
| ABC COMPANY | 603-555-1234 | |
| BESTCO. INC | 617-123-5656 | |
| XYZ COMPANY | 508-123-5000 | |

- ✓ OK
- ✗ CANCEL
- ? HELP
- ADD
- DELETE

*FIG. 3*

TELEPHONE PARAMETERS

SYSTEM TYPE:
☒ 75/61/63    ☐ 85/62

| EXTENSION OF CONNECTED PHONE: | x0 |
| MASTER REDIRECT NUMBER: | x0 |
| NUMBER OF LINE APPEARANCES: | 1 |
| ID/NAME START POSITION: | 0 |
| CALLER INPUT BUTTON: | 0 |
| CALLER INPUT STARTING POSITION: | 0 |
| CALLER INPUT LENGTH: | 0 |

- ✓ OK
- ✗ CANCEL
- ? HELP

*FIG. 4*

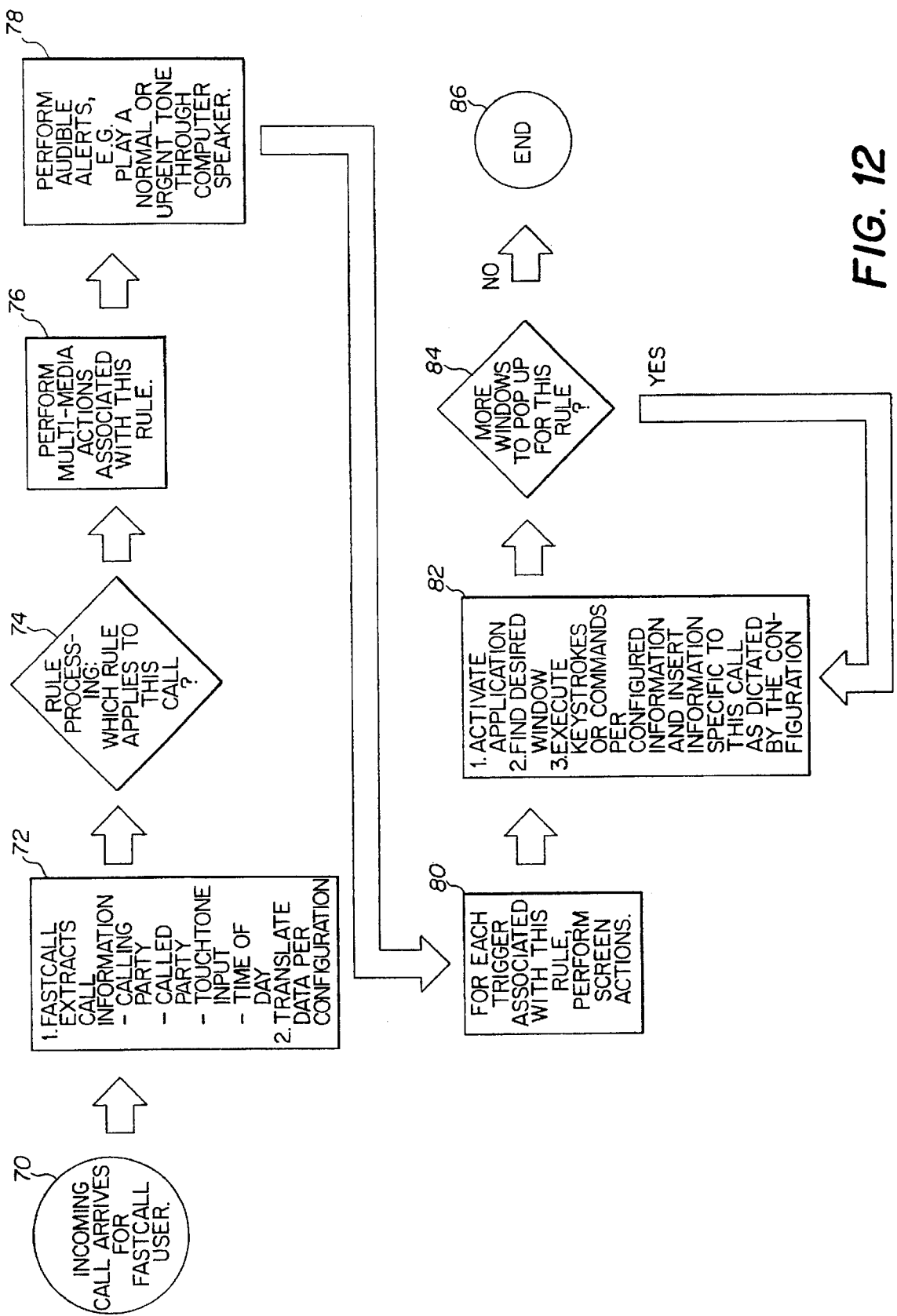

INCOMING CALL RULES

PRIORITY: 2

DESCRIPTION: ACCOUNTS PAYABLE RULE 1

CRITERIA:
- ○ ALL
- ◉ ANY

- ☒ TIME OF DAY
- ☒ CALLING NUMBERS
- ☐ CALLED NUMBERS
- ☒ CALLER INPUT

FROM: HOUR 07 ⇩ MINUTE 00 ⇩ AM ⇩
TO: HOUR 06 ⇩ MINUTE 00 ⇩ PM ⇩

☐ ENABLED

CALLING NUMBER SELECTIONS:
- ABX COMPANY
- ATTENDANT
- HOOSAMATHINGY'S, INC.
- INTERNATIONAL WIDGETS
- JANE SMITH
- MIS

CALLED NUMBER SELECTIONS:

CALLER INPUT SELECTIONS:
- ACCOUNTING
- ACCOUNTS PAYABLE
- ACCOUNTS RECEIVABLE
- CUSTOMER SERVICE
- PRODUCTION
- SALES

ACTION DESIRED: FORWARD TO VOICE MAIL ⇩

[✓ OK] [✗ CANCEL] [? HELP] [ADD] [DELETE] [NEXT] [PREV] [FIRST] [LAST] [ALERTS]

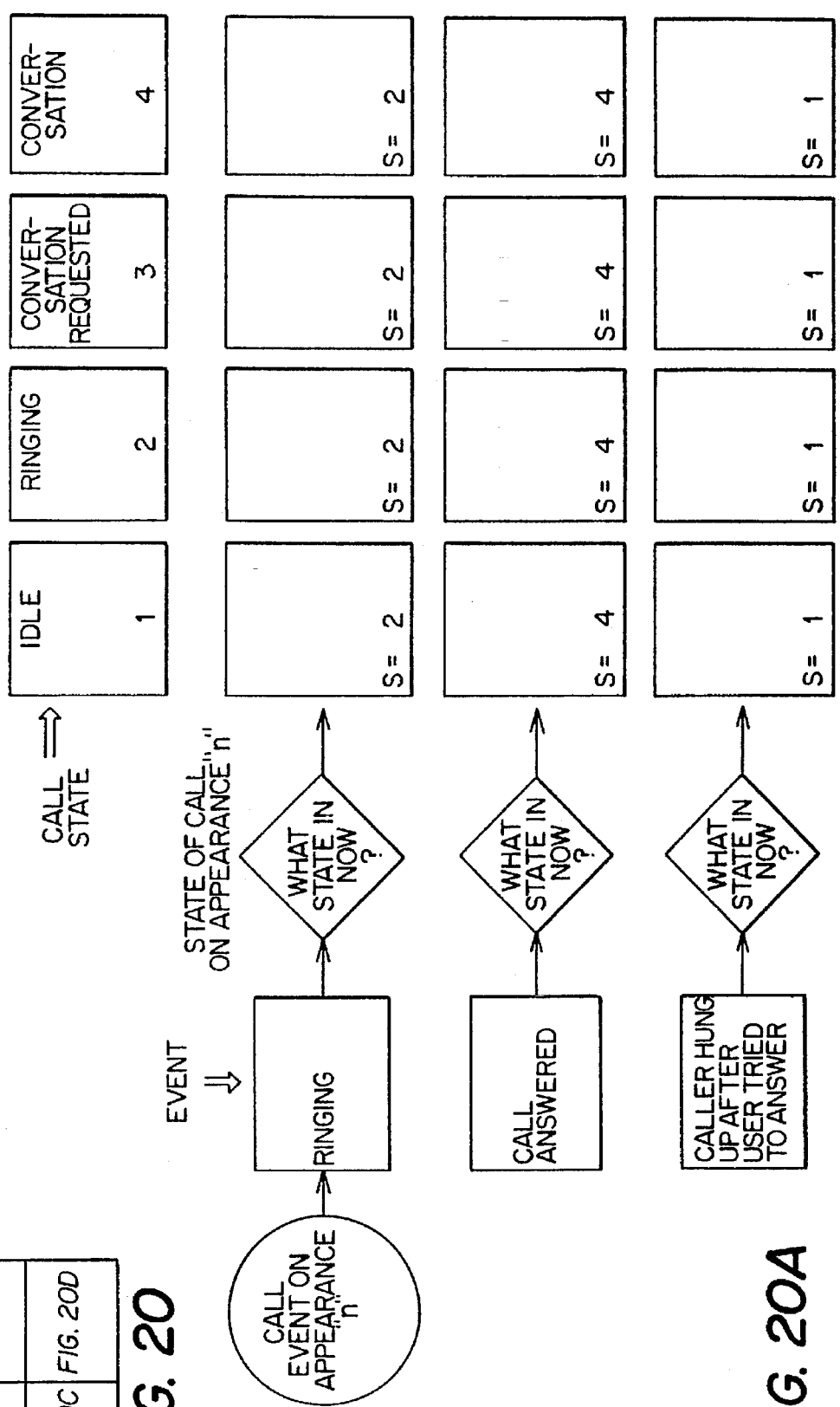

FIG. 20B

| HANGUP REQUESTED 5 | HOLD 6 | HOLD REQUESTED 7 | TRANSFER COMPLETE PENDING 8 | TRANSFER REQUESTED 9 | CONFERENCE COMPLETE PENDING 10 | CONFERENCE REQUESTED 11 |
|---|---|---|---|---|---|---|
| S = 2 | S = 2 | S = 2 | S = 2 | S = 2 | S = 2 | S = 2 |
| S = 4 | S = 4 | S = 4 | S = 4 | S = 4 | S = 4 | S = 4 |
| S = 1 | S = 1 | S = 1 | S = 1 | S = 1 | S = 1 | S = 1 |

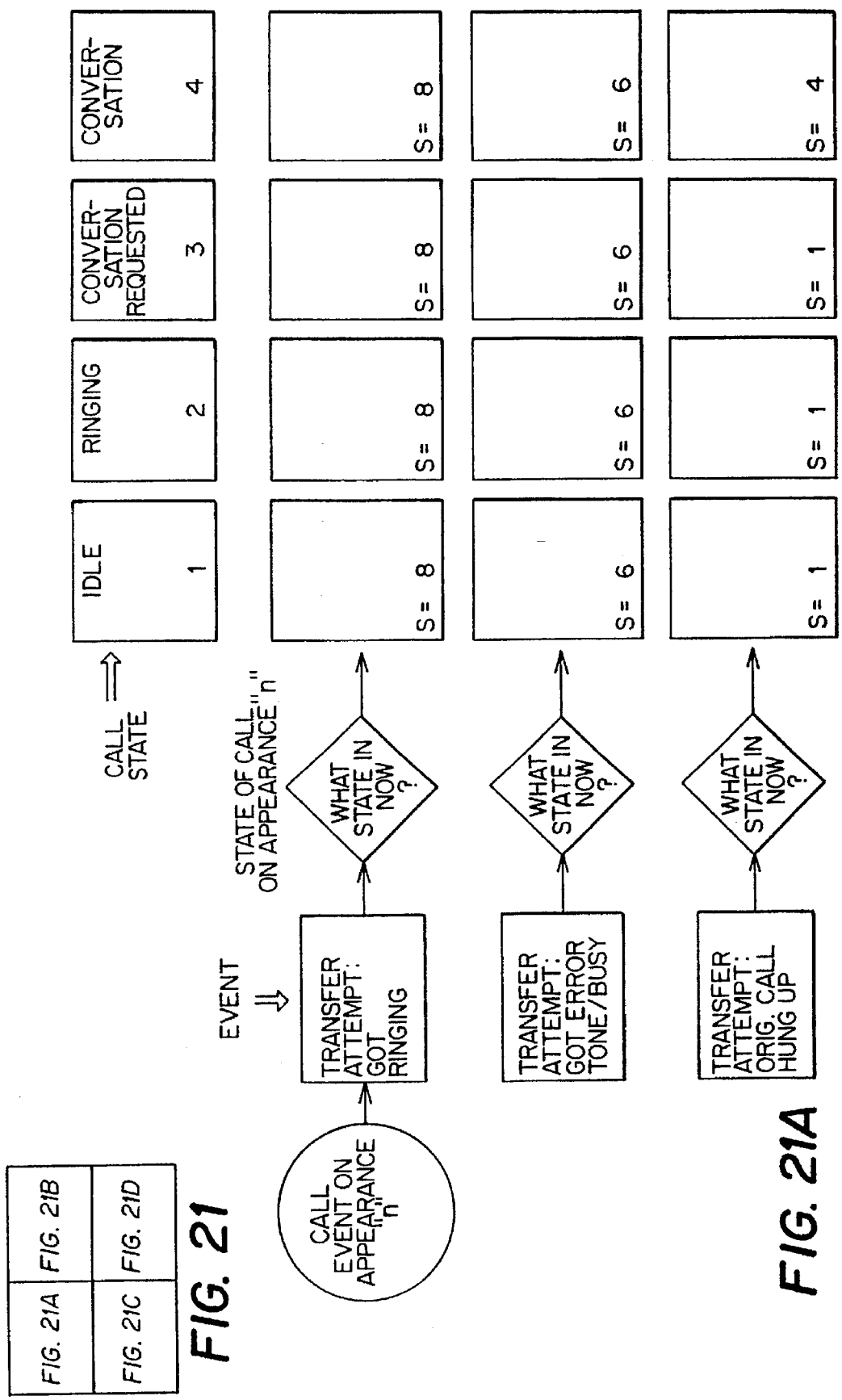

FIG. 21B

| HANGUP REQUESTED 5 | HOLD 6 | HOLD REQUESTED 7 | TRANSFER COMPLETE PENDING 8 | TRANSFER REQUESTED 9 | CONFERENCE COMPLETE PENDING 10 | CONFERENCE REQUESTED 11 |
|---|---|---|---|---|---|---|
| S = 8 | S = 8 | S = 8 | S = 1 | S = 8 | S = 8 | S = 8 |
| S = 6 | S = 6 | S = 6 | S = 6 | S = 6 | S = 6 | S = 6 |
| S = 1 | S = 1 | S = 1 | S = 1 | S = 1 | S = 1 | S = 1 |

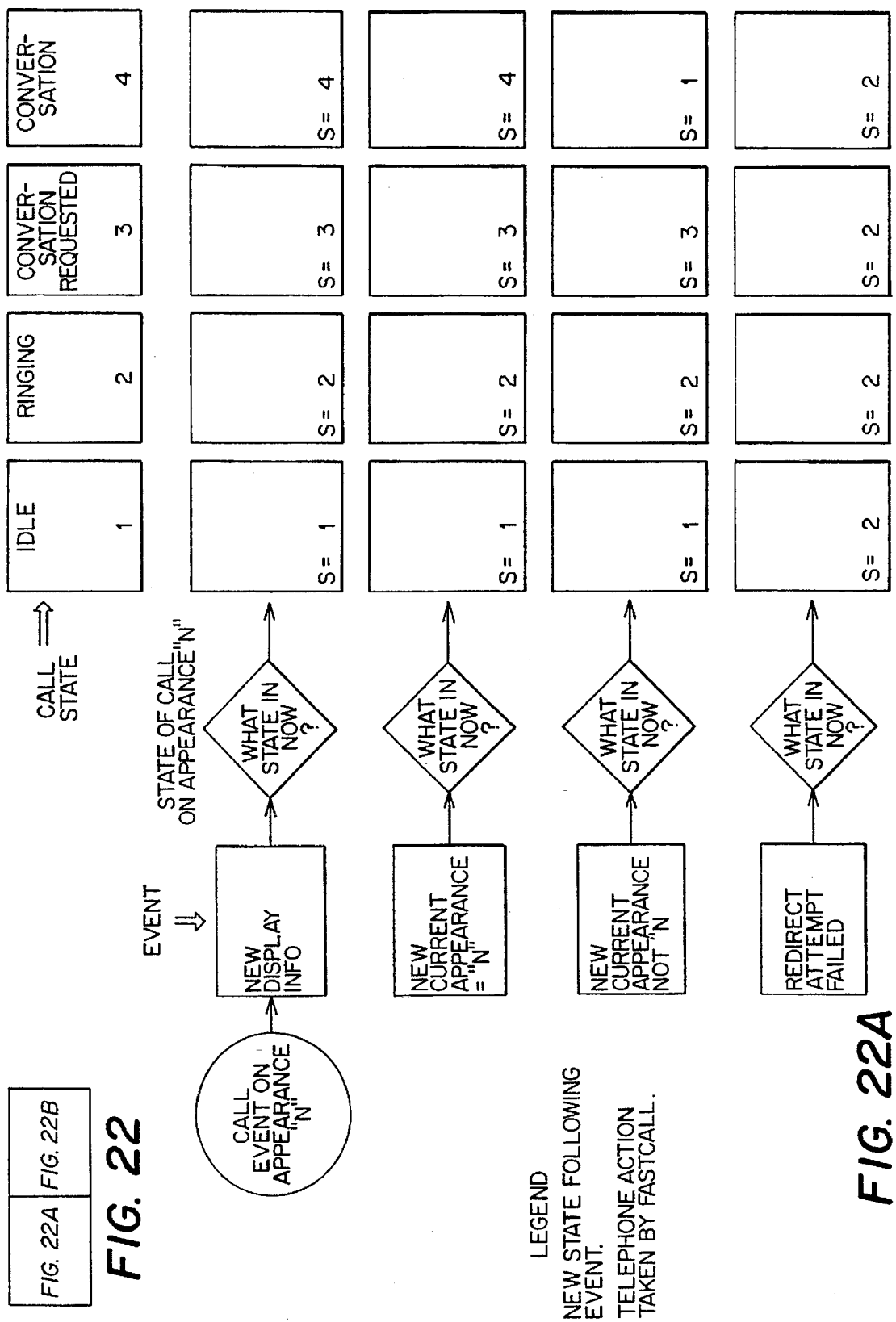

FIG. 22B

| | | | | |
|---|---|---|---|---|
| CONFER-ENCE REQUESTED 11 | S = 11 | S = 4 | S = 11 | S = 2 |
| CONFER-ENCE COMPLETE PENDING 10 | S = 10 | S = 4 | S = 10 | S = 2 |
| TRANSFER REQUESTED 9 | S = 9 | S = 4 | S = 9 | S = 2 |
| TRANSFER COMPLETE PENDING 8 | S = 8 | S = 4 | S = 8 | S = 2 |
| HOLD REQUESTED 7 | S = 7 | S = 7 | S = 7 | S = 2 |
| HOLD 6 | S = 6 | S = 6 | S = 6 | S = 2 |
| HANGUP REQUESTED 5 | S = 5 | S = 5 | S = 1 | S = 2 |

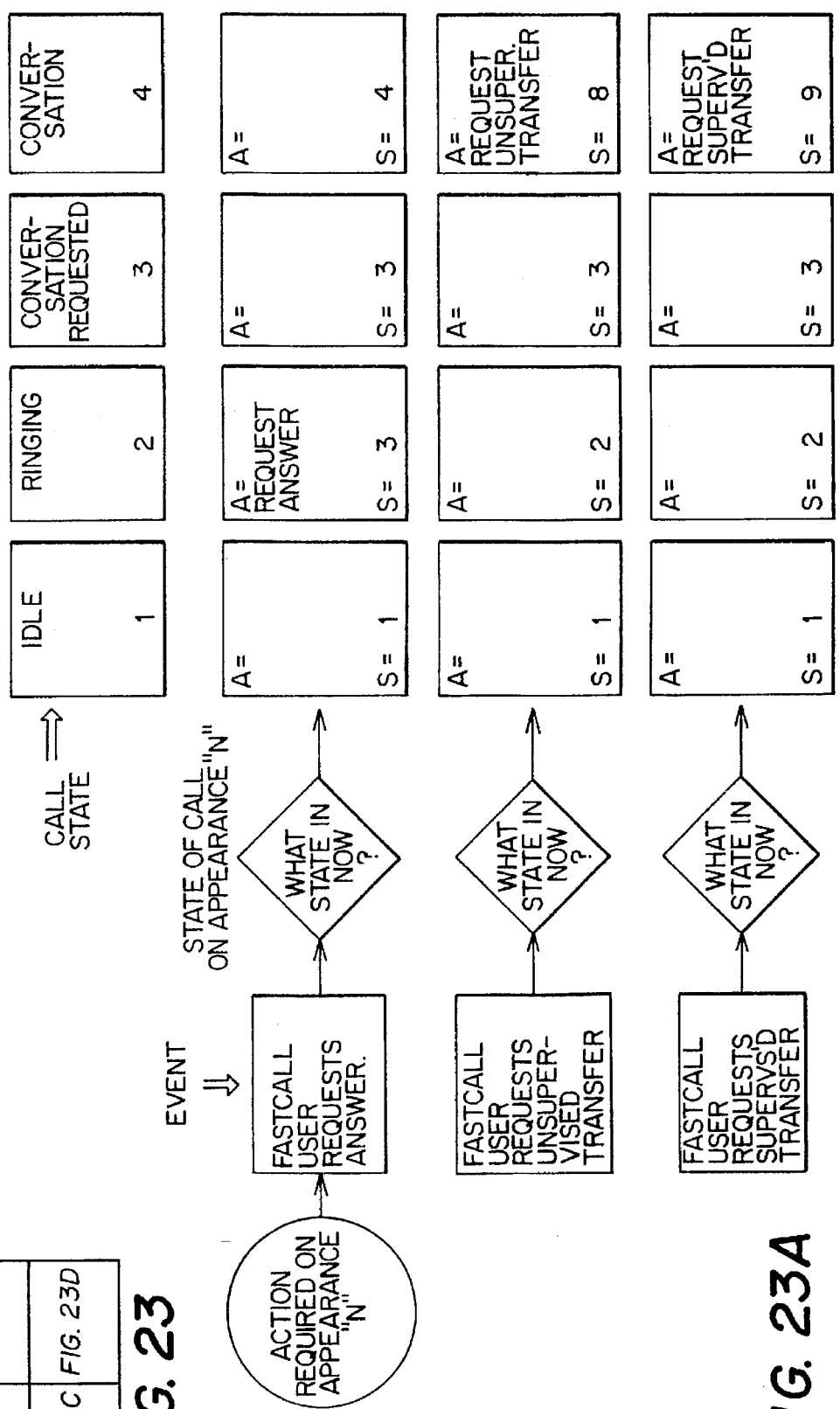

FIG. 23B

| HANGUP REQUESTED 5 | HOLD 6 | HOLD REQUESTED 7 | TRANSFER COMPLETE PENDING 8 | TRANSFER REQUESTED 9 | CONFERENCE COMPLETE PENDING 10 | CONFERENCE REQUESTED 11 |
|---|---|---|---|---|---|---|
| A = REQUEST ANSWER<br>S = 3 | A = REQUEST ANSWER<br>S = 3 | A =<br>S = 7 | A = REQUEST ANSWER<br>S = 3 | A = REQUEST ANSWER<br>S = 3 | A = REQUEST ANSWER<br>S = 3 | A = REQUEST ANSWER<br>S = 3 |
| A =<br>S = 5 | A =<br>S = 6 | A =<br>S = 7 | A = REQUEST TRANSFER COMPLETE<br>S = 5 | A =<br>S = 9 | A =<br>S = 10 | A =<br>S = 11 |
| A =<br>S = 5 | A =<br>S = 6 | A =<br>S = 7 | A = REQUEST TRANSFER COMPLETE<br>S = 5 | A =<br>S = 9 | A =<br>S = 10 | A =<br>S = 11 |

FIG. 23D

| A=<br>S=5 | A=<br>S=5 | A=<br>S=5 | A=REQUEST DIAL<br>S=5 | A=<br>S=5 |
| --- | --- | --- | --- | --- |
| A=<br>S=6 | A=<br>S=6 | A=<br>S=6 | A=REQUEST DIAL<br>S=6 | A=REQUEST HANG UP<br>S=5 |
| A=<br>S=7 | A=<br>S=7 | A=<br>S=7 | A=REQUEST DIAL<br>S=7 | A=REQUEST HANG UP<br>S=5 |
| A=<br>S=8 | A=<br>S=8 | A=<br>S=8 | A=REQUEST DIAL<br>S=8 | A=REQUEST HANG UP<br>S=8 |
| A=<br>S=9 | A=<br>S=9 | A=<br>S=9 | A=REQUEST DIAL<br>S=9 | A=REQUEST HANG UP<br>S=9 |
| A=REQUEST CONF'NCE COMPLETE<br>S=10 | A=<br>S=10 | A=<br>S=10 | A=REQUEST DIAL<br>S=10 | A=REQUEST HANG UP<br>S=10 |
| A=<br>S=11 | A=<br>S=11 | A=<br>S=11 | A=REQUEST DIAL<br>S=11 | A=REQUEST HANG UP<br>S=11 |

CALL PROCESSOR FOR A COMPUTER TELEPHONE INTEGRATION SYSTEM

This application is a continuation of application Ser. No. 08/490,325, filed Jun. 14, 1995, which is a continuation of application Ser. No. 08/198,821 filed on Feb. 18, 1994 both now abandoned.

FIELD OF INVENTION

This invention relates to a call processor for a computer-telephone integration system which allows incoming and outgoing calls to be handled according to precedential rules.

BACKGROUND OF INVENTION

Computer-Telephone Integration (CTI) generally refers to a system in which a computer automatically responds to an incoming (or outgoing) telephone call. One application is in the consumer catalog business for a computer system which includes a data base of catalogue items and previous orders by customers. A computer-telephone integration system lets the customer service representative know the name of the calling customer without asking. The caller's telephone number, or a keyed in identification number, is extracted from the telephone system and fed into the computer to automatically retrieve and display data as required. Computer-telephone integration systems save time and greatly increase productivity. Such systems are used in the airline industry for handling fare and ticket queries and in many other businesses which regularly handle customer calls.

Computer-Telephone Integration is also applicable to outbound call handing. In applications such as account collections, a user of a CTI system could make many more contacts per day by the more efficient call processing that CTI affords. For example, A CTI system can automatically extract a telephone number from an application database record, and send commands to the telephone switching device that will dial the number extracted. This reduces keystroke and button push time for the user. In addition, A CTI system could command the telephone switching device to automatically dial from a list of telephone numbers (e.g. delinquent accounts) and not connect the call to a user until it has been determined that a live person has answered, eliminating calls unanswered, busy calls and calls answered by a telephone answering device.

Heretofore, however, such systems were individually configured to handle incoming or outgoing calls. That is, at any one site, technicians must install the hardware and software which allows the telephone to communicate with the database and spreadsheet programs existing on the computer system at the site. One reason for this is that individual computer application programs require the entry of unique commands to retrieve files. For example, a database program may require one set of commands to retrieve certain data while a spreadsheet application program may require quite different commands. The problem is compounded when users set up their own files and fields of data within those application programs because then the commands required to retrieve a file are unique to that user's system. Differences in operating systems are also a factor in customization.

Therefore, it is nearly impossible to design a computer telephone integration system which uniformly works with different application programs such as d-BASE, LOTUS 123, CARDFILE, etc. which all require different command sequences to retrieve files and/or data.

So, those skilled in the art of computer programming and system design would interface the user's computer to its telephone system and then write one program to access, for example, the accounts receivable data base file based on the caller's telephone number or other identification. Another program would be written to access for example, credit information spreadsheet files based on the same information.

This methodology requires knowledge of computer programming techniques and is often a large, time consuming, and expensive undertaking requiring the assistance of outside contractors.

Another consideration in computer-telephone integration systems is establishing rules for call handling. Some callers may need specialized treatment, such as a service representative who can speak a certain foreign language, or who is familiar with a specific caller's account. Some calls and some callers may always require priority handling while other calls, during a certain time period for example, could be rerouted or recorded and then handled at a later, less busy time. These priority rules are also usually individually programmed by those skilled in the art. Such priority rule programs, however, are site specific and will not work on other systems nor would they be applicable to another business.

Finally, there are many different manufacturers of telephone switching devices used in a computer-telephone integration system. Each manufacturer generally establishes unique protocols for the telephone functions to be performed on the computer such as the dial, hold, answer, conference, and transfer functions.

Again, those skilled in the art must write specific interface programs so that the commands from the computer keyboard are correctly recognized by the telephone switching device, and vice-versa.

In general then, computer telephone integration systems are generally custom designed and integrated for individual customers for use only at the customer site.

SUMMARY OF INVENTION

It is therefore an object of this invention to provide a computer telephone integration system which does not require programming skills to set up and operate.

It is a further object of this invention to provide such a computer telephone integration system which uniformly configures the computer system independent of the application program commands required to retrieve information based on incoming and outgoing calls.

It is a further object of this invention to provide such a computer-telephone integration system which allows precedential "call handling" rules to be established for retrieving application program data information based on call information and time of day.

It is a further object of this invention to provide such a computer-telephone integration system which uniformly processes incoming and outgoing telephone calls independent of the different switching device command protocols established by the telephone switch manufacturer.

It is a further object of this invention to provide such a computer-telephone integration system which, when provided to the end user, correctly interfaces with many different types of application programs, telephone switching devices, and call handling priority rule procedures.

It is a further object of this invention to provide an ergonomic computer-telephone integration system which is user friendly and does not require programming skills or knowledge of telephone switching device protocols.

This invention results from the realization that an application and site independent rule-based computer-telephone integration system is effected by a call processor which uniformly establishes precedential rules for retrieving application program information based on incoming call information thereby eliminating the need to individually program call handling rules for each application at each site. It was realized that the user can in fact specify the precedential rules and then a call processor routine can be invoked to later implement the rules eliminating the need to write specific programs for call handling. This solves the problem of requiring each computer-telephone integration system to be set up and programmed to invoke call handling rules by those skilled in the art of computer programming.

This invention features and may comprise, consist of, or essentially consist of a rule-based computer-telephone integration system including telephone means for transmitting call information; computer means in communication with the telephone means including a plurality of application programs having data retrievable in response to call information transmitted by the telephone means; and call processor means, operable on the computer means, including means for uniformly establishing precedential rules for retrieving application program data based on the call information and means for automatically executing the established precedential rules in response to the transmitted call information.

Each precedential rule may include criteria which must be met before the rules are executed including a calling party's number, the called party's number, time of day information, and input keyed in and transmitted. There may be means for translating a calling parties number into a criteria code.

The call processor means further includes means for denoting rule priority and for evaluating rules in order of priority and means for analyzing which rule criteria are met by an incoming call on the telephone means. If a rule is to accept a call received by said telephone means, the means for automatically executing includes means for accepting the call. If rule is to forward a call received by the telephone means, the means for automatically executing includes means for transferring the call.

This invention also features a system for uniformly establishing precedential rules for call handling on a computer in communication with a telephone system comprising call processor means operable on the computer for uniformly establishing precedential rules for retrieving computer application program data based on call information; and means for automatically invoking the established precedential rules upon receipt of call information transmitted by the telephone system. The call processor means further includes means for assigning priority among the rules and further includes means for establishing call criteria for a rule which must be met before a rule is invoked. There are means for detecting an incoming call on the telephone means and extracting call criteria from the incoming call and for matching call criteria with the rules in order of priority.

This invention also features a method of establishing a rule-based computer-telephone integration system comprising transmitting call information by telephone means in communication with computer means which includes a plurality of application programs having data retrievable in response to call information transmitted by said telephone means; and establishing and storing precedential rules on the computer means and retrieving the application program data based on the call information and automatically executing the established precedential rules in response to transmitted call information.

The method further includes establishing criteria for the precedential rules which must be met before the rules are executed including denoting at least one of a calling party's number, a called party's number, and input keyed in and transmitted to the telephone means by a caller. The method further includes means for translating a calling party's number into a criteria code and analyzing which rule criteria are met by an incoming call on the telephone means.

A rule is established to accept a call received by the telephone means and a rule is established to transfer a call received by the telephone means.

This invention further features a method for uniformly establishing precedential rules for call handling on a computer in communication with a telephone system comprising establishing precedential rules for retrieving computer application program data based on call information; and automatically invoking the established precedential rules upon receipt of call information transmitted by the telephone system. Establishing precedential rules includes entering and storing the precedential rules on the computer in order of priority, and further includes entering and storing criteria which must be met before a rule is invoked and entering and storing the action to be taken if the criteria is met and a rule is invoked.

Automatically invoking the precedential rules includes detecting an incoming call on the telephone system and extracting the criteria from the call. Automatically invoking the precedential rules further includes searching though the stored rules in order of priority until the criteria of the call matches the criteria of a rule.

DISCLOSURE OF PREFERRED EMBODIMENT

Other objects, features and advantages will occur to those skilled in the art from the following description of a preferred embodiment and the accompanying drawings, in which:

FIG. 3 is a view of a screen for entering telephone numbers according to the set-up routine of FIG. 2;

FIG. 4 is a view of a screen for denoting the telephone parameters according to the set-up routine of FIG. 2;

FIG. 12 is a block diagram of incoming telephone call processing according to the computer-telephone integration system of this invention once the set-up routine of FIG. 2 is accomplished;

FIG. 16 is a view of a screen for entering a call forwarding rule according to FIG. 14;

FIGS. 18, 19, 19A and 19B are block diagrams of the rules-based call processing routines of the computer-telephone integration system according to this invention; and FIGS. 20–20D, 21–21D, 22–22B, and 23–23D are a block diagrams of the state machine for translating stored switching device commands into established telephone functions for uniformly processing incoming telephone calls independent of individual switching device commands of the computer-telephone integration system of this invention.

THE COMPUTER-TELEPHONE INTEGRATION SYSTEM

Figure 1:
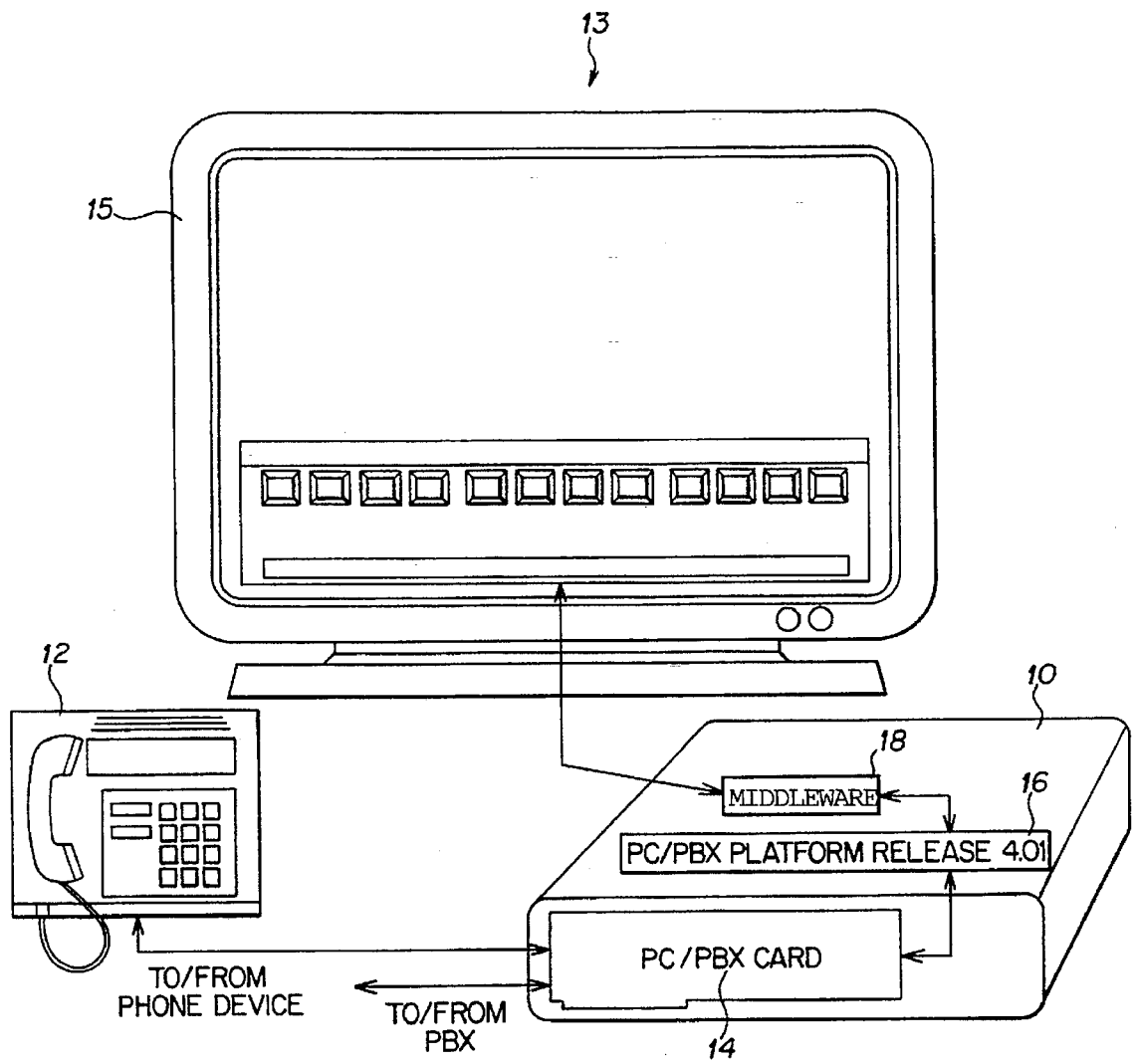
FIG. 1 is a schematic diagram of the primary hardware and software subsystems of the computer-telephone integration system of this invention.

The computer-telephone integration system 13 of this invention includes computer 10, FIG. 1, such as an IBM compatible personal computer. Connected to computer 10 is telephone system 12 such as an AT&T 7400 Series Telephone. System 13 also includes switch interface 14 such as an AT&T PC/PBX Card and switch interface drivers 16 such as PC/PBX Platform Release 4.01 for extracting call information (such as a telephone number) from an incoming call received by telephone 12 and forwarding call information to computer 10. Switch interface 14 could also be a stand alone module that plugs into a communication port of the computer. Alternatively switch interface 14 could be a local area network connection to a server which is centrally interfaced to the switch. Monitor 15 is for viewing database records, spreadsheet data and the like automatically retrieved in response to an incoming call on telephone 12.

According to this invention, middleware program layer 18 is "inserted" between computer 10 (and the application programs operating thereon) and telephone system 12 including the switching device 14 and platform 16 to uniformly configure computer 10.

Middleware program layer 18 automatically and uniformly configures computer 10 so that the commands required to retrieve files from any application program stored on computer 10 are recorded and then executed in response to an incoming call.

By way of example, if computer 10 is used in a large university, one application program may be a database of student grade data, one application program may be a database of student loan data, and one application program may be a spreadsheet including charitable contribution information. A WINDOWS type operating system provides access to the application programs running on local or remote computer hardware as is known. As discussed in the Background of Invention above, since the grade database, the student loan database, and charitable contribution spreadsheet application programs might all have different command string sequences to retrieve files and data, computer 10 would normally be individually programmed such that when a telephone call is received, one program operates to retrieve grade information, one program operates to receive student loan information, and still a third program operates to retrieve charitable contribution information. These programs, however, may not work on different computer systems which also may interface with different types of telephone switch devices. And, if the user of the system adds another application program, a programmer would be called in to add still another interface program.

This labor intensive prior method is eliminated according to this invention which is described in more detail below.

Figure 5:
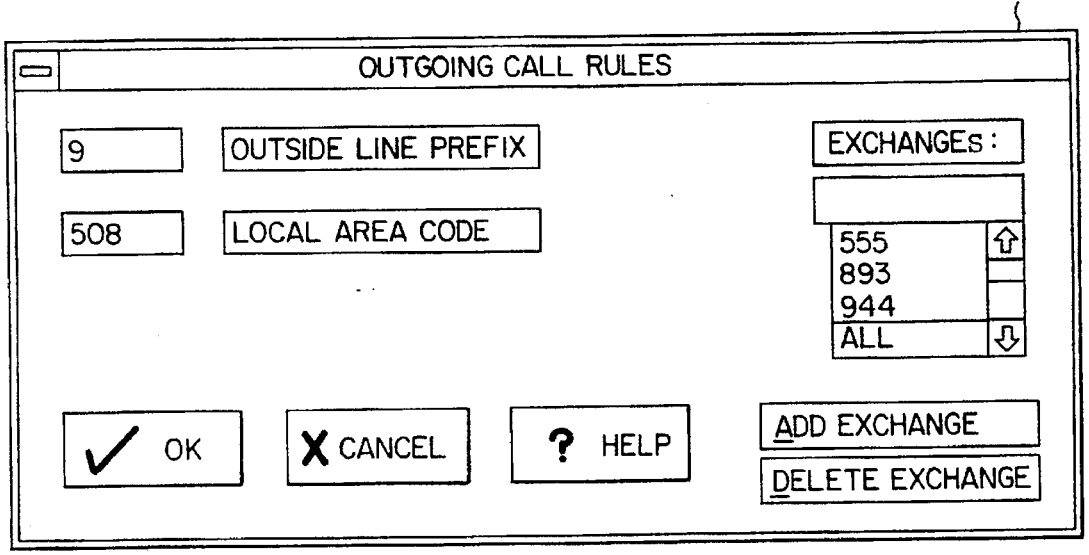
FIG. 5 is a view of a screen for entering area code information according to the set-up routine of FIG. 2.
Figure 6:
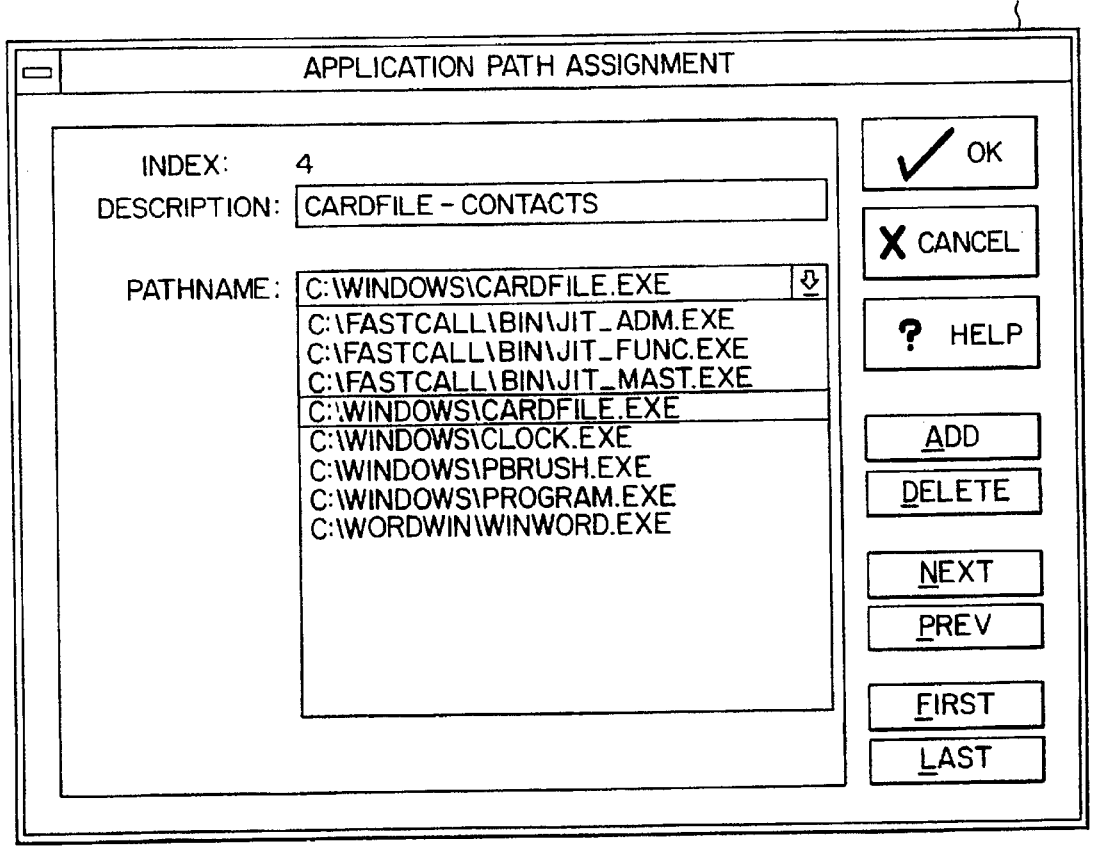
FIG. 6 is a view of a screen for entering application path assignments according to the set-up routine FIG. 2.

Uniform Configuration of the Computer-Telephone System to Access Application Program Data According to this invention, middleware program 18, FIG. 1, operates on computer 10 providing uniform configuration of computer 10 to handle incoming and outgoing calls. Middleware program 18 allows the user to enter the system phone numbers and dialing parameters, steps 20 and 22, FIG. 2. FIG. 3 shows screen 21 of middleware program 18 for entering the system telephone numbers; FIG. 4 shows screen 23 for entering the system type and parameters, FIG. 5 shows screen 25 for entering area code information, and screen 27, FIG. 6 shows selection of application path assignments.

Figure 7:
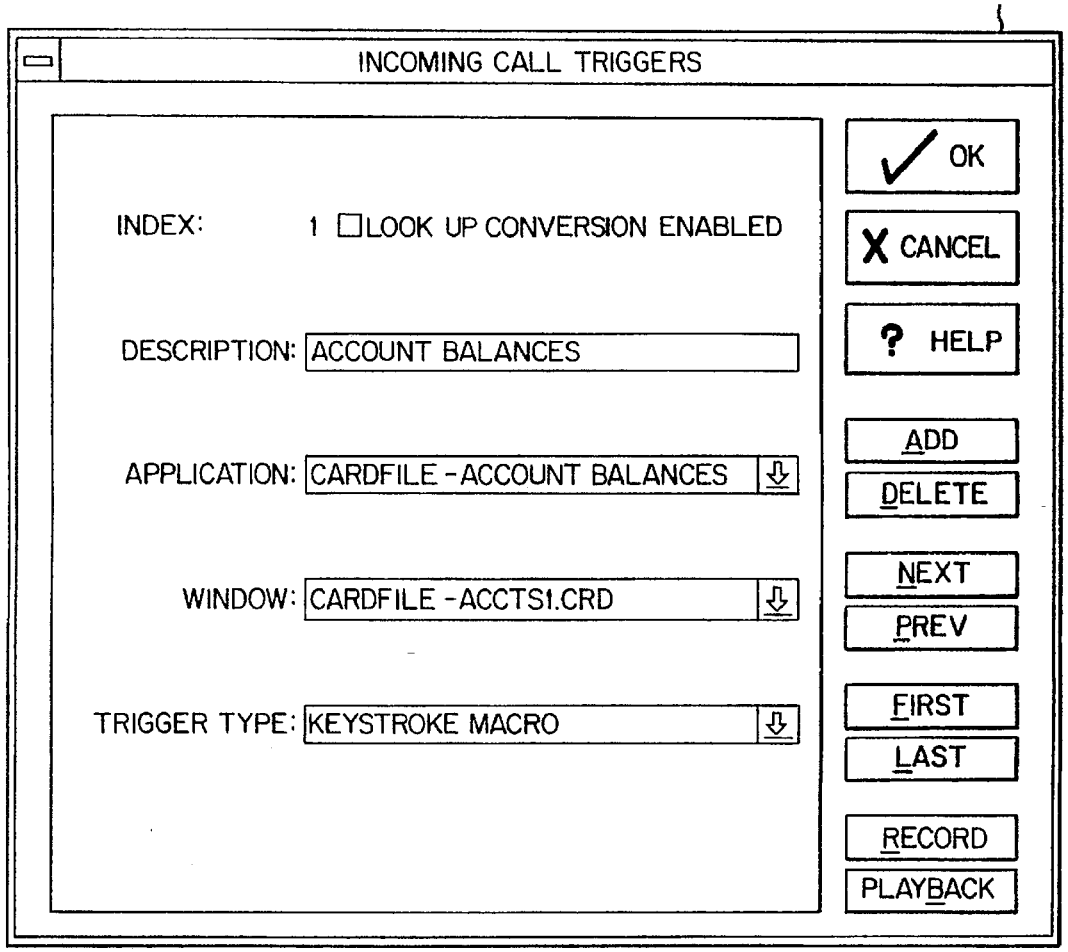
FIG. 7 is a view of a screen for entering incoming call triggers according to the set-up routine of FIG. 2.

For example the user site may have a number of telephone lines each of which receive incoming calls. Middleware program 18 then allows the user to enter the system applications, step 24, FIG. 2. The database and spreadsheet application programs discussed above are entered in screen 29, FIG. 7. Since there may be different windows for each application, the user enters the windows for each application, as shown in screen 29, FIG. 7 and screen 33, FIG. 9 for incoming and outgoing calls respectively.

Figure 8:
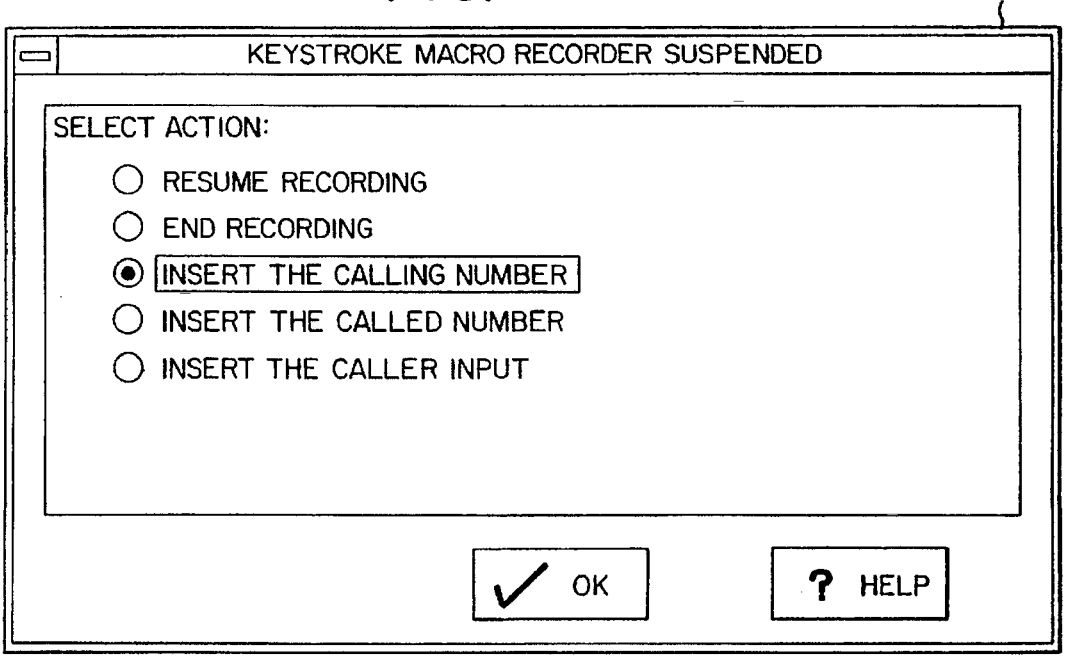
FIG. 8 is a view of a screen for entering windows for incoming calls according to the set-up routine of FIG. 2.
Figure 9:
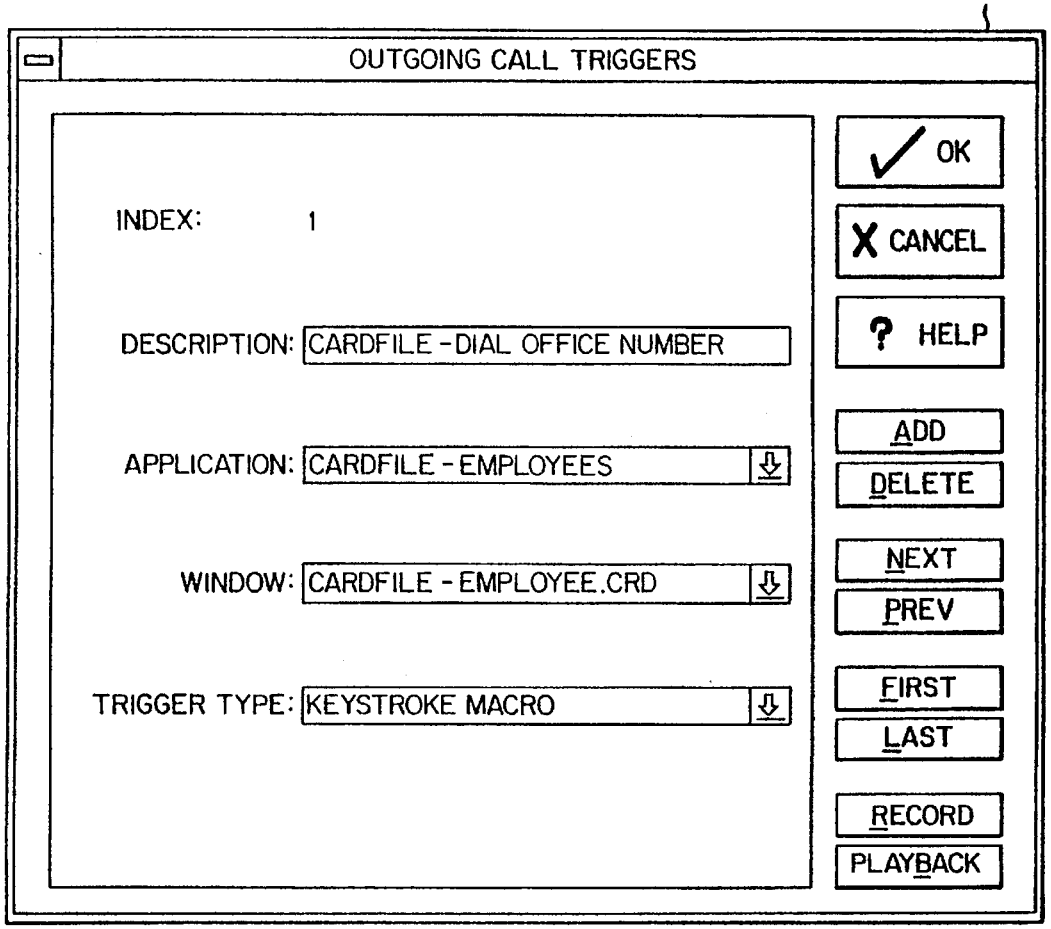
FIG. 9 is a view of a screen for creating outgoing call triggers according to the set-up routine of FIG. 2.

For each window, step 28, the user types in the commands required to retrieve a screen or record based on call information from telephone set 12, as extracted by board 14 and platform 16, FIG. 1. This command string, entered in screens 31 and 33, FIGS. 8 and 9 is then stored and referred to as a "trigger".

Figure 2:
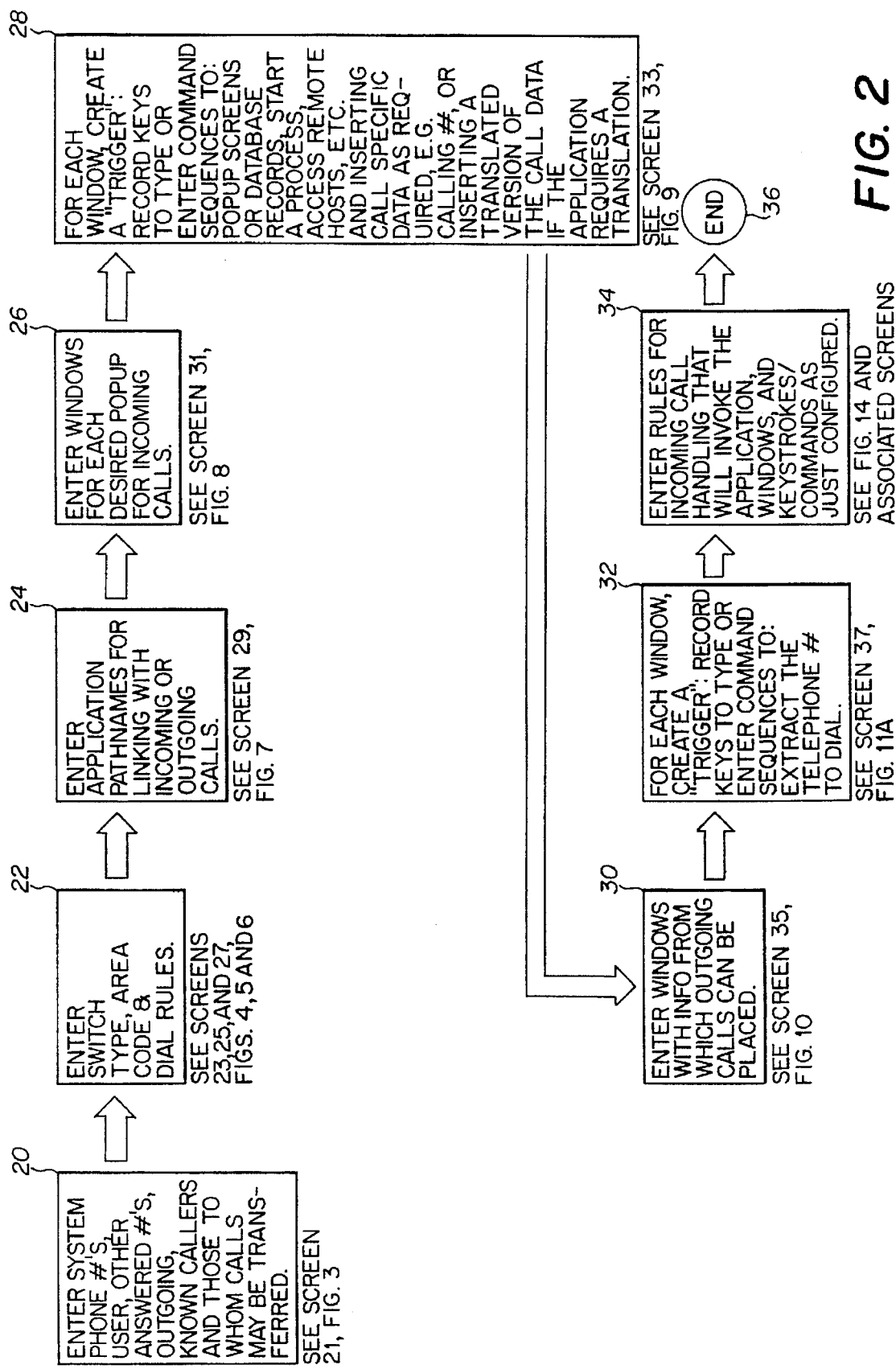
FIG. 2 is a block diagram of a set up routine for uniformly configuring the computer-telephone integration system of FIG. 1 to access different application programs according to this invention.

Returning to the previous example, the university employee enters the telephone numbers of the administrative office in step 20, FIG. 2. After establishing the switch type, area code, and dial rules, step 22, he then enters the names of the grade and financial aid database application programs and the charitable contribution spreadsheet application program, step 24. For the database program, he enters the grade window and the financial aid window and for the spreadsheet programs he enters the charitable contribution window, step 26. For each window, he enters the commands required to retrieve a screen by telephone number. There may be one command string required to retrieve the grades of a student by phone number and another command string required to retrieve the financial aid information of a student by phone number. And, there may be a different set of commands required to retrieve charitable contribution information from the spreadsheet application program based on a callers phone number.

But, having previously worked with these application programs, the user knows these commands and enters them in step 28, FIG. 2. Middleware program 18, FIG. 1, then records these commands and will automatically repeat them later upon receipt of an incoming call. Note that the system is easily configured without the need for computer programmers or individual programs created for each application.

Figure 10:
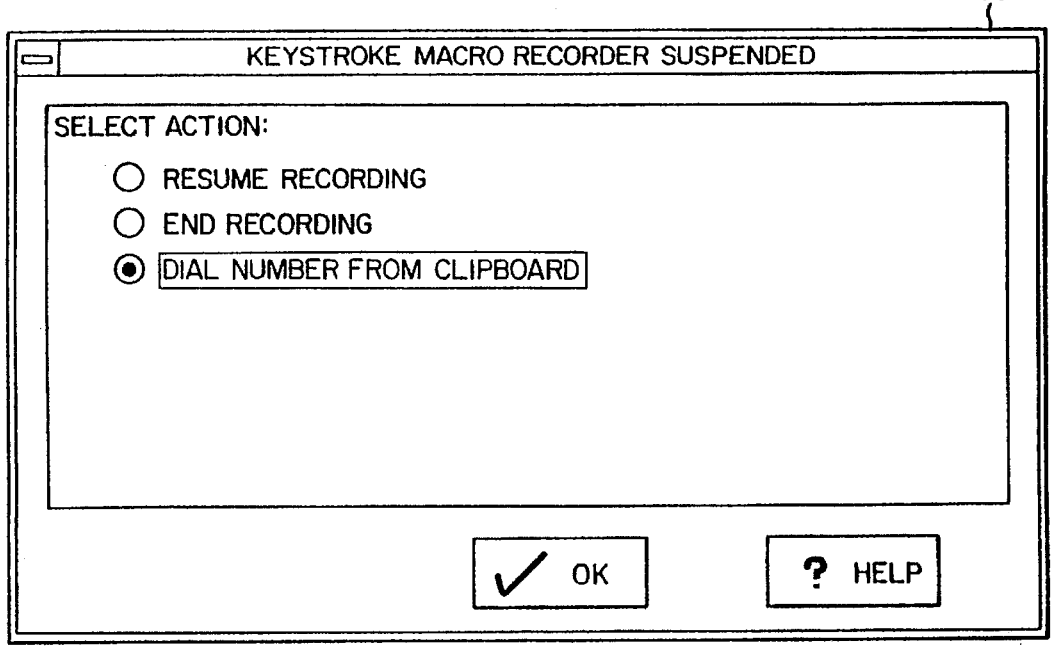
FIG. 10 is a view of a screen for entering windows for outgoing calls according to the set-up routine of FIG. 2.
Figure 11A:
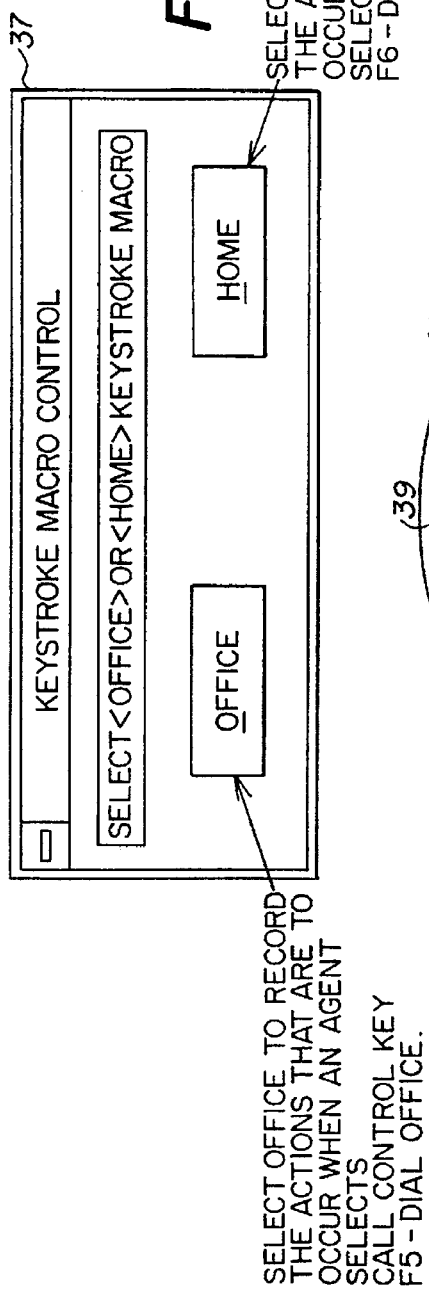
FIG. 11A is a view of a screen for extracting outbound dialing numbers.
Figure 11B:
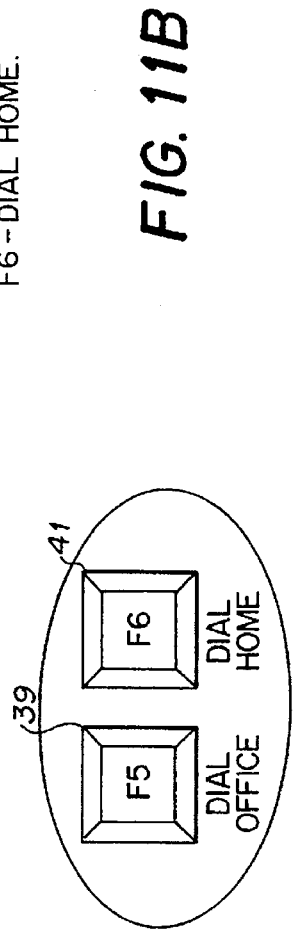
FIG. 11B is a view of the control function keys for selecting outbound dialing numbers for the screen of FIG. 11A.
Figure 11C:
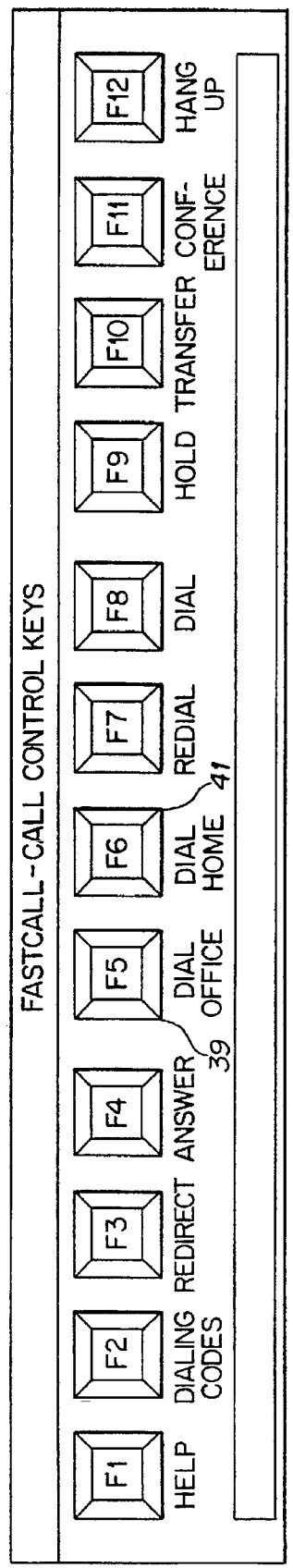
FIG. 11C is a view of the complete set of control function keys.

A similar process is performed for outgoing call automation. The windows are entered from which outgoing calls can be placed, step 30, FIG. 2. See screen 35, FIG. 10. For each window, step 32, FIG. 2, the user creates a trigger as with incoming calls and then types the commands required to extract two telephone numbers, e.g. home and office, and pass them on to the middleware layer for outbound dialing. See screen 37, FIG. 11A. Control keys 39, 41, etc., FIG. 11C and 11B assist in making these selections quickly.

This process is repeated for each application and after this set-up routine is completed, the system is uniformly configured to access all the user's application programs and retrieve data in response to call information. When a telephone call is received on telephone set 12, FIG. 1, an applicable rule may be executed as shown in the routine shown in FIG. 12.

Incoming Call Processing

After a call arrives, step 70, FIG. 12, call information is extracted, step 72, such as the caller's telephone number. A determination is then made as to which rule applies to the incoming call, step 74, the appropriate multi-media actions associated with the rule are performed, step 76, audible alerts are performed, step 78, and each trigger is activated, step 80. This activates the appropriate application, step 82. If more windows are accessed, step 84, processing returns to step 82, otherwise processing for this call ends, step 86. The application is automatically retrieved, and the correct window is activated automatically since middleware program 18, FIG. 1, enters the previously recorded commands and inserts the call information as required upon receipt of an incoming call. In essence, the user who knows how to access the various application programs on his/her system teaches middleware program 18 once how to retrieve the application programs in response to an incoming call and thereafter middleware program 18 automatically processes incoming calls.

So, for example, upon receipt of an incoming call step 70, FIG. 12, from a student, her telephone number is extracted, step 72, and the appropriate rule is invoked, step 74. The database application program is retrieved, step 82, and the grades (and/or financial aid) window is activated. Middleware program 18, FIG. 1, then automatically enters the previously recorded command string (step 28, FIG. 2) and inserts the extracted student phone number at the correct place in the command string. The telephone number, extracted from the switching device including board 14 and drivers 16, FIG. 1, is then inserted at the correct place in the command string to retrieve the grade information data for the particular student calling the administrative office.

Or, if an individual calls and requests information on making a charitable contribution, his phone number is extracted and a different rule is invoked, step 74, FIG. 12. The spreadsheet application program is retrieved, step 82, the correct charitable contribution window is activated, and the middleware program enters the correct spreadsheet commands to retrieve the callers charitable contribution information based on his phone number.

In this way, the user was not required to individually program computer 10, FIG. 1, to handle incoming calls based on the many possible different command sequences required to pull files and data from different application programs. The user is only required to "teach" middleware program 18, FIG. 1, what she already knows, namely the commands for each application program, and thereafter the program remembers the commands and correctly processes all future incoming calls.

Figure 13:
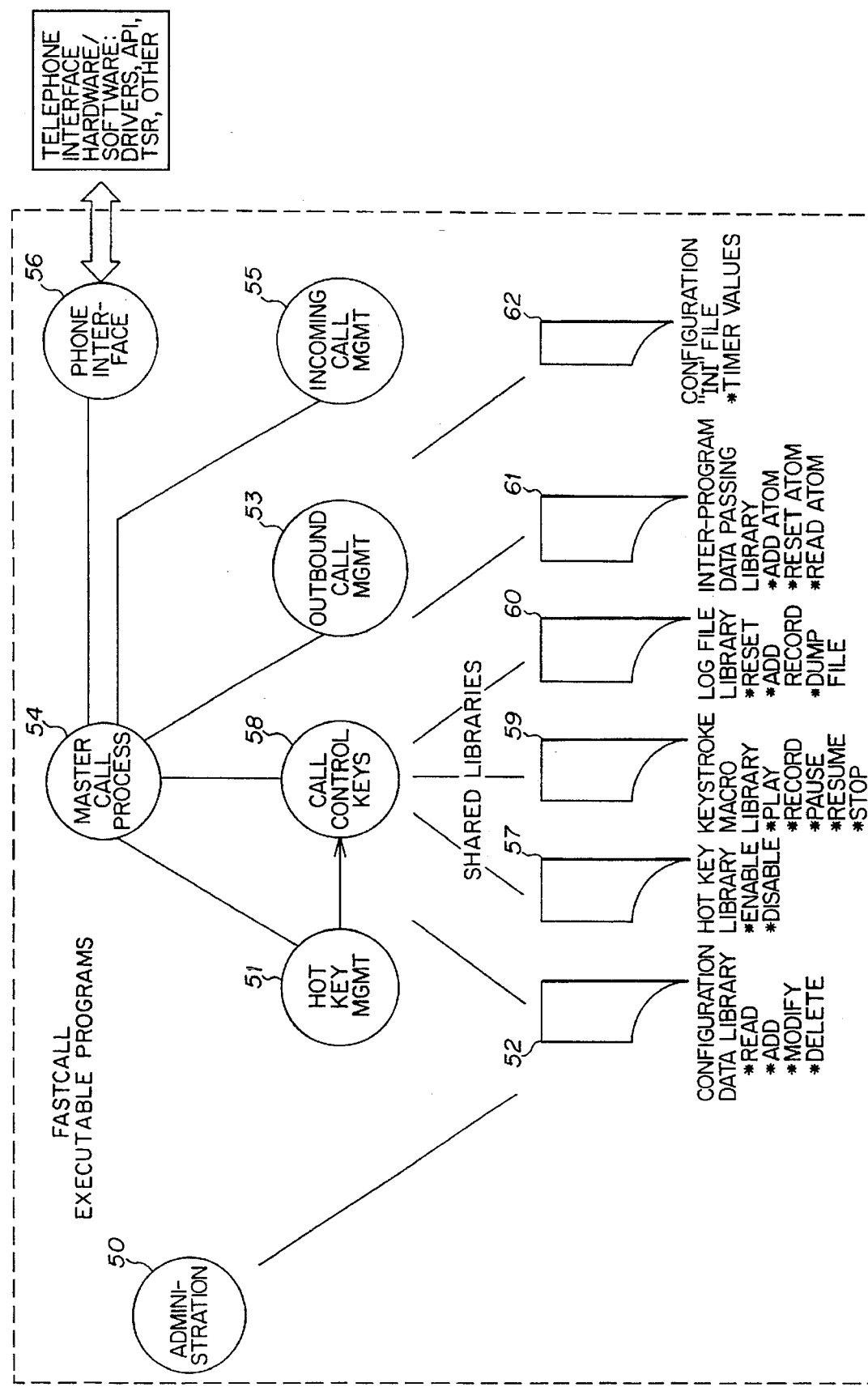
FIG. 13 is a block diagram of the relationship between the executable programs and the libraries of the computer-telephone integration system according to this invention.

The set up routine depicted in FIG. 2 is contained in a stand alone executable program. The entire software of the invention is depicted in FIG. 13, where the set up routine 50 is labeled "administration". The actual data configured in the setup routine is stored in a set of binary files. The command sequences, or "triggers" are stored in specially identified macro files that may be updated whenever the user re-records a new commands sequence for a specific application window. Many other configuration parameters, such as system telephone numbers, various user modes, local area code, etc. are stored in files as well, and are accessed as required during the processing of incoming and outgoing calls through the middleware. As setup information is entered by either the user or a site-wide administrator, this information is stored via the use of dynamic library commands, such as "add trigger", "delete trigger", "add rule", "modify rule", etc., as depicted by the Configuration Data Library 52. This library is then accessed by other programs that handle the call-by-call-processing, via commands such as "read trigger", "read rule", "read call numbers", etc., The function of the library is to provide a consistent way for multiple programs to simultaneously access the configuration files for reading, writing, or modifying.

If multiple applications or a variety of call handling scenarios are desirable, it may be necessary to establish and implement a set of rules for processing incoming calls. For example, student calls on one telephone number may be put through only during certain time periods when they invoke a financial aid database to pop-up on the user's screen, while telephone calls from wealthy individuals seeking to make charitable contributions would always be handled immediately and would invoke the charitable contribution spreadsheet. Establishing and implementing these precedential rules is described in more detail below.

Establishing Precendential Rules

Figure 17:
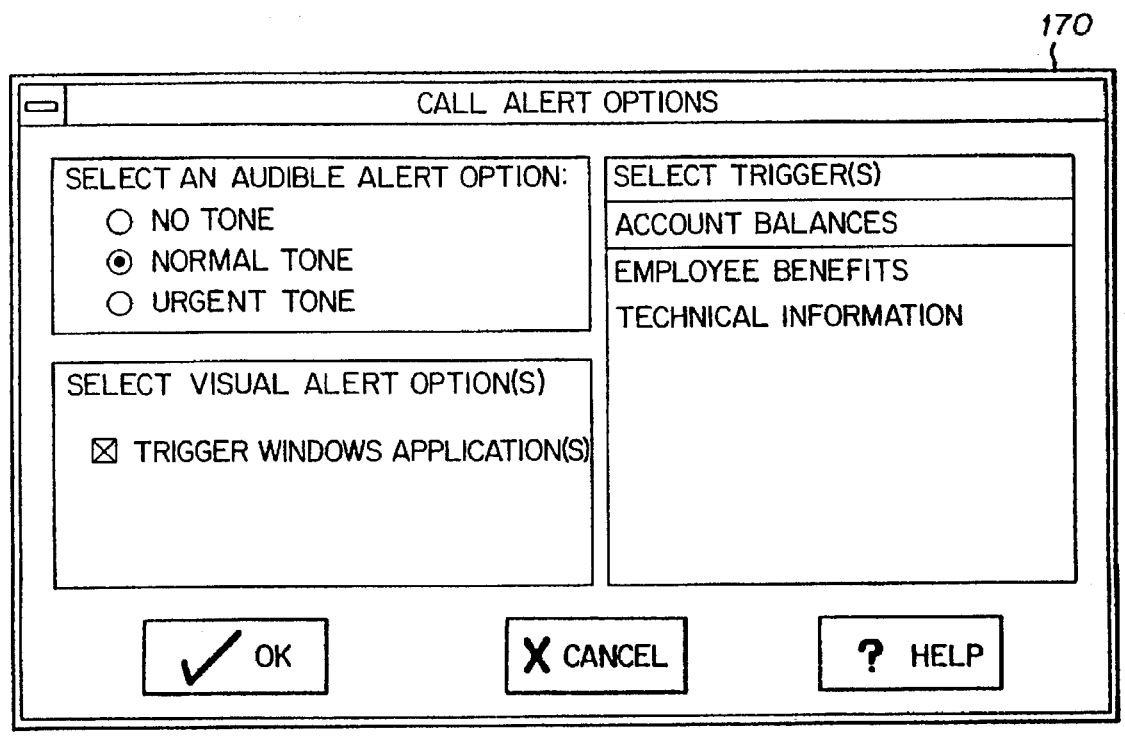
FIG. 17 is a view of screen for selecting call alert options.

The call processor for establishing and executing precedential rules according to this invention is described below. Once a decision is made to add, modify or delete incoming call rules, step 120, FIG. 14, the priority handling rules are established in order of priority as shown in step 122 for the first rule, step 124, and the priority is set to the number of the rule being established. See screens 150 and 160, FIGS. 15 and 16. The user enters the call information, step 126, FIG. 14, and then enters the rule handling criteria. For example, the time of day, the calling numbers, the called numbers, and/or caller input may form the criteria of the call handling rule to be established. The user enters the action desired, step 128. If the action desired is to accept the call, the user specifies the desired sound tone the computer will emit step 130, as shown in screen 170, FIG. 17 and then selects the "trigger". This trigger denotes which application program, window, and associated command sequence should be invoked for the call information chosen. If the action desired in step 128 is not to accept the call, the user specifies the forwarding number, step 134, also shown in screen 160, FIG. 16, plus an optional trigger. All this information is stored, and the user then establishes the rule next in priority, step 124, FIG. 14.

The priority based rule sub-system used by the invention is based upon a boolean expression evaluation of specific criteria that an incoming call must meet. If an incoming call's information satisfies the criteria of a rule, that rule is executed. The rules are evaluated in a priority order, so that only the highest priority rule satisfied is executed. Rules are processed at various times during a call based upon user configurable modes, e.g. before a call is answered, as a call is answered, upon a user action, etc. Rules may be processed more than once for each call, as more information about the call is transmitted by the telephone switching device. This is particularly useful for calls that are transferred from one party to the user of the invention, in that when the transfer is completed, the information about the original call as well as the transferred party is transmitted to the invention, so that further computer commands, or triggers may be executed based upon this new information.

Figure 14:
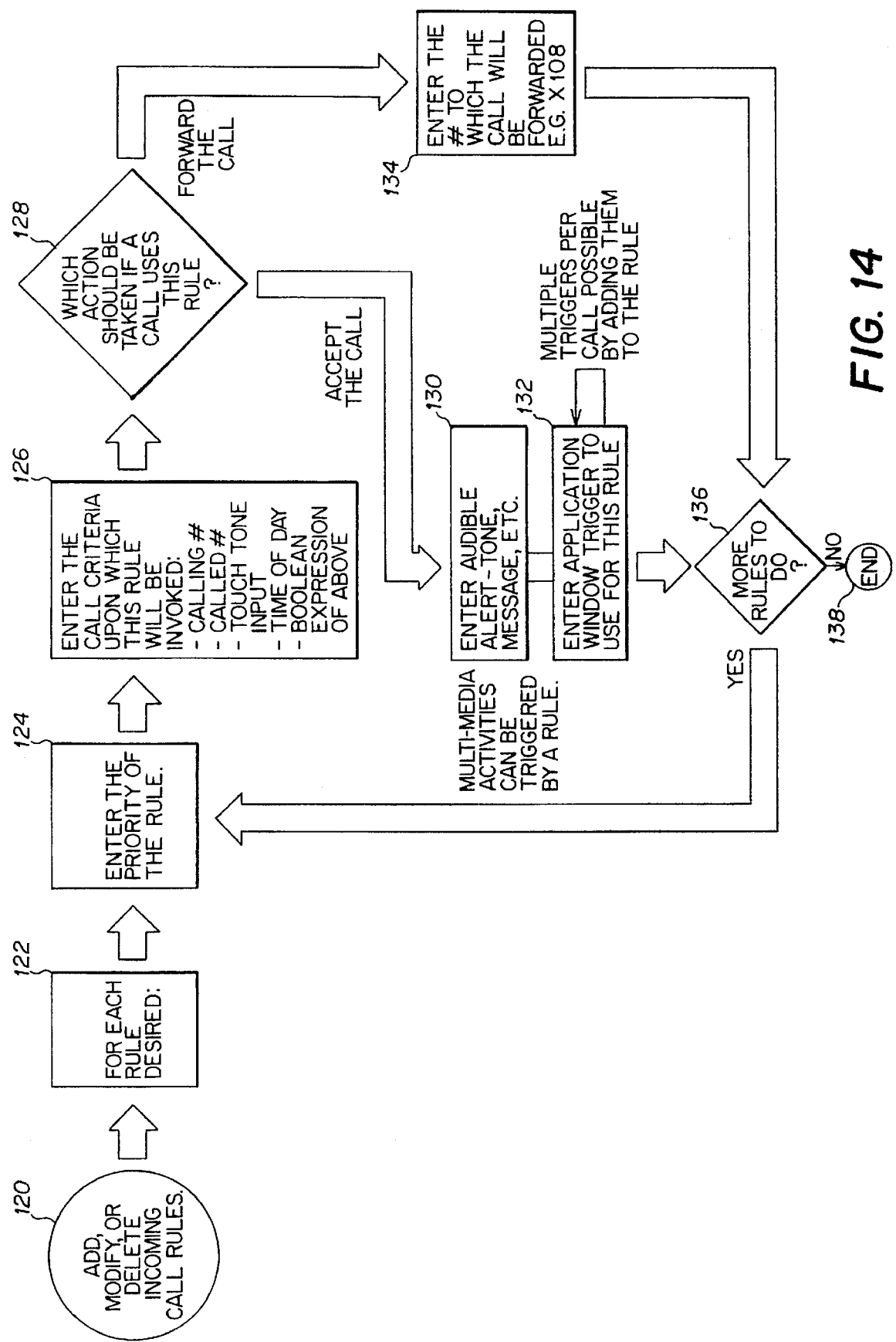
FIG. 14 is a block diagram of the routine for uniformly establishing precedential rules for the computer-telephone integration system of this invention.
Figure 15:
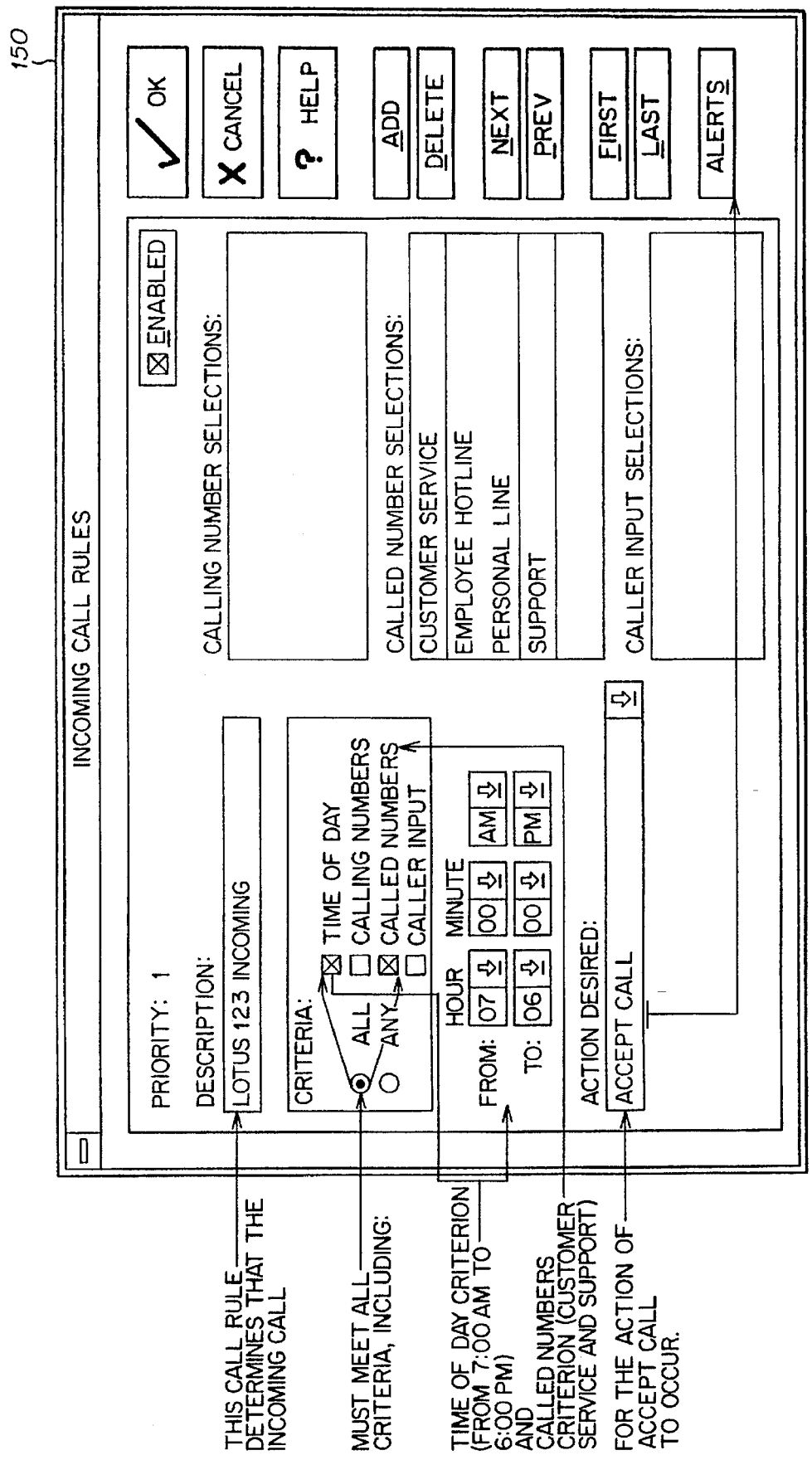
FIG. 15 is a view of a screen for establishing incoming call precedential rules according to FIG. 14.
Figure 18:
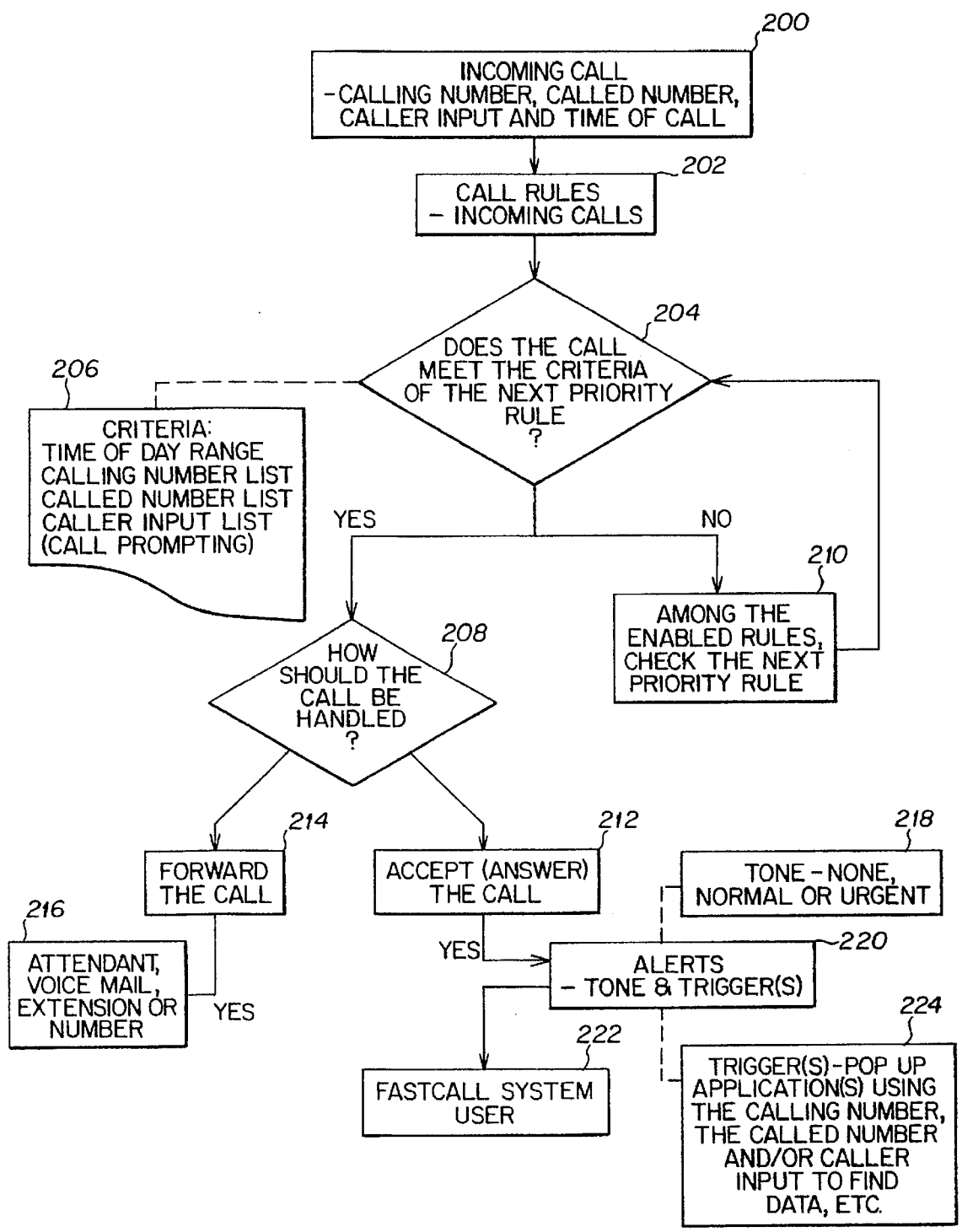
Figures 19, 19A:
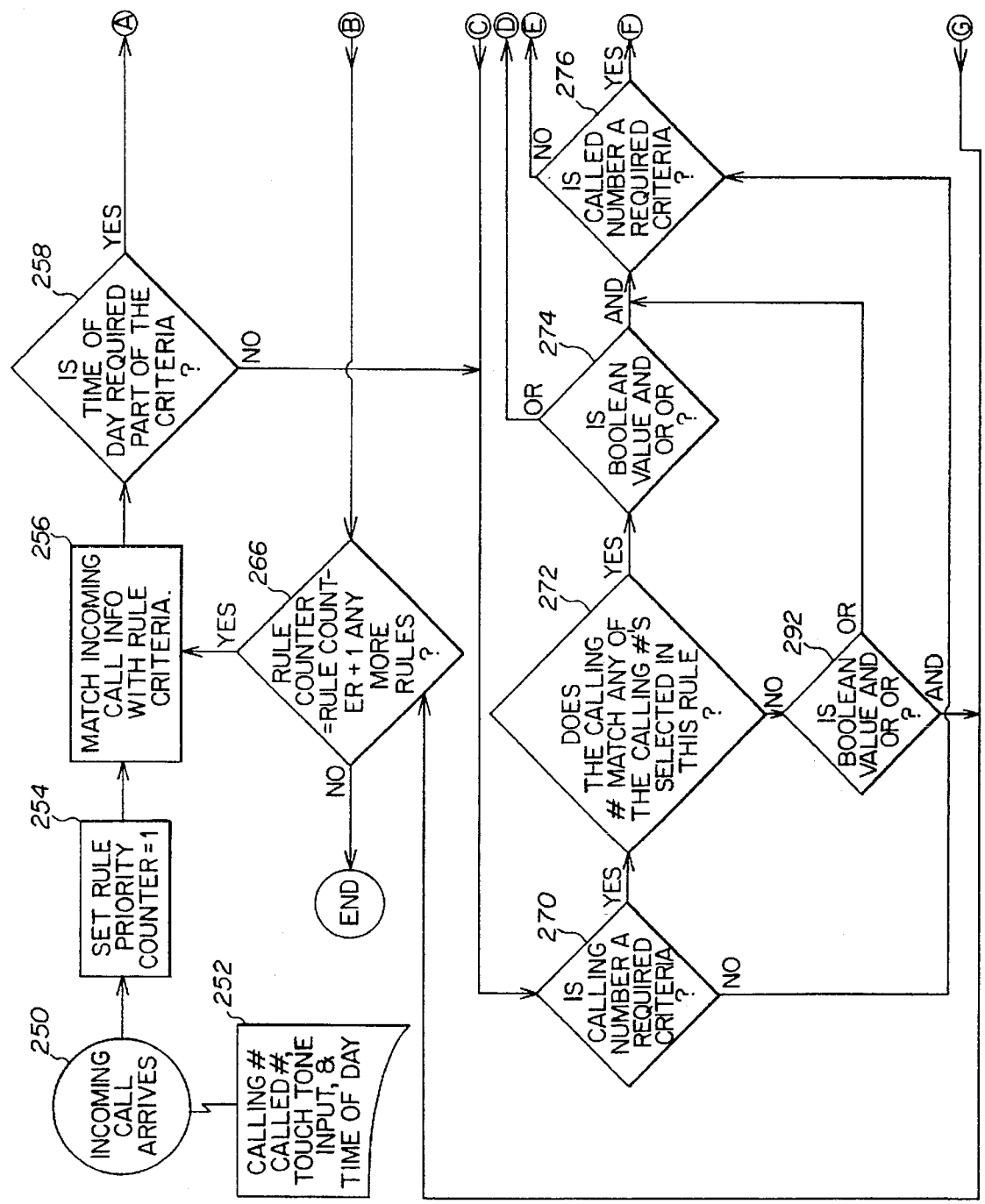

The criteria for the call may be based upon several pieces of information, including the calling party's number (or a translation of this number), the number dialed by the caller (or a translation of this number), touch tone input keyed in by the caller (or a translation of this number), and/or the time of day. A combination of multiple selections of the numbers and a time of day range may be specified in a boolean expression that requires "ALL" of the criteria to be met, i.e. if calling and called numbers are specified, then both must be matched for the rule to apply, or "ANY" of the criteria to be met, i.e. if calling and called numbers are specified, if either numbers are matched, then the rule applies. Extensions of the boolean expression to use are anticipated by the invention. FIGS. 14, 18, and 19 detail the rule process used by the invention, in increasing levels of detail. FIGS. 18–19 describe how the software actually handles a call and determines which rule applies, if any, for a given incoming call.

In step 200, FIG. 18, an incoming call arrives to the system. Information is passed to the system or is queried by the system from the telephone device. This information includes one or more of the following elements: calling number, called number, caller input (touch tones dialed by caller), and time the call was received.

The invention then enters a software loop, the purpose of which is to determine which, if any, of the predefined call rules applies to this particular call (step 202). Call rules may be dynamically enabled or disabled by the user, so that the loop is only processed for currently enabled rules, permitting temporary changes in call flow handling. In step 204, the call information is matched against the criteria entered for the next highest priority rule (more detail on this is described below in association with FIG. 19). If a match is not found for this rule (step 210), the loop is continued and the call information is matched against the next priority enabled rule, until all enabled rules are exhausted. If a match is found (step 208) then the loop is exited, and the action specified by the rule is taken. This action can either be to forward the call to an alternative telephone number (NOT accept the call) as in steps 214, 216, or the action can be to accept (answer) the call as in step 212. If the call is accepted, then various activities occur; this invention anticipates general multimedia activity to result here, e.g. the playing of various predefined sounds, voice messages, etc, through the computer (step 220, 218), the triggering of application screens and commands that perform computer functions based upon the current call information (step 224).

Figure 19B:
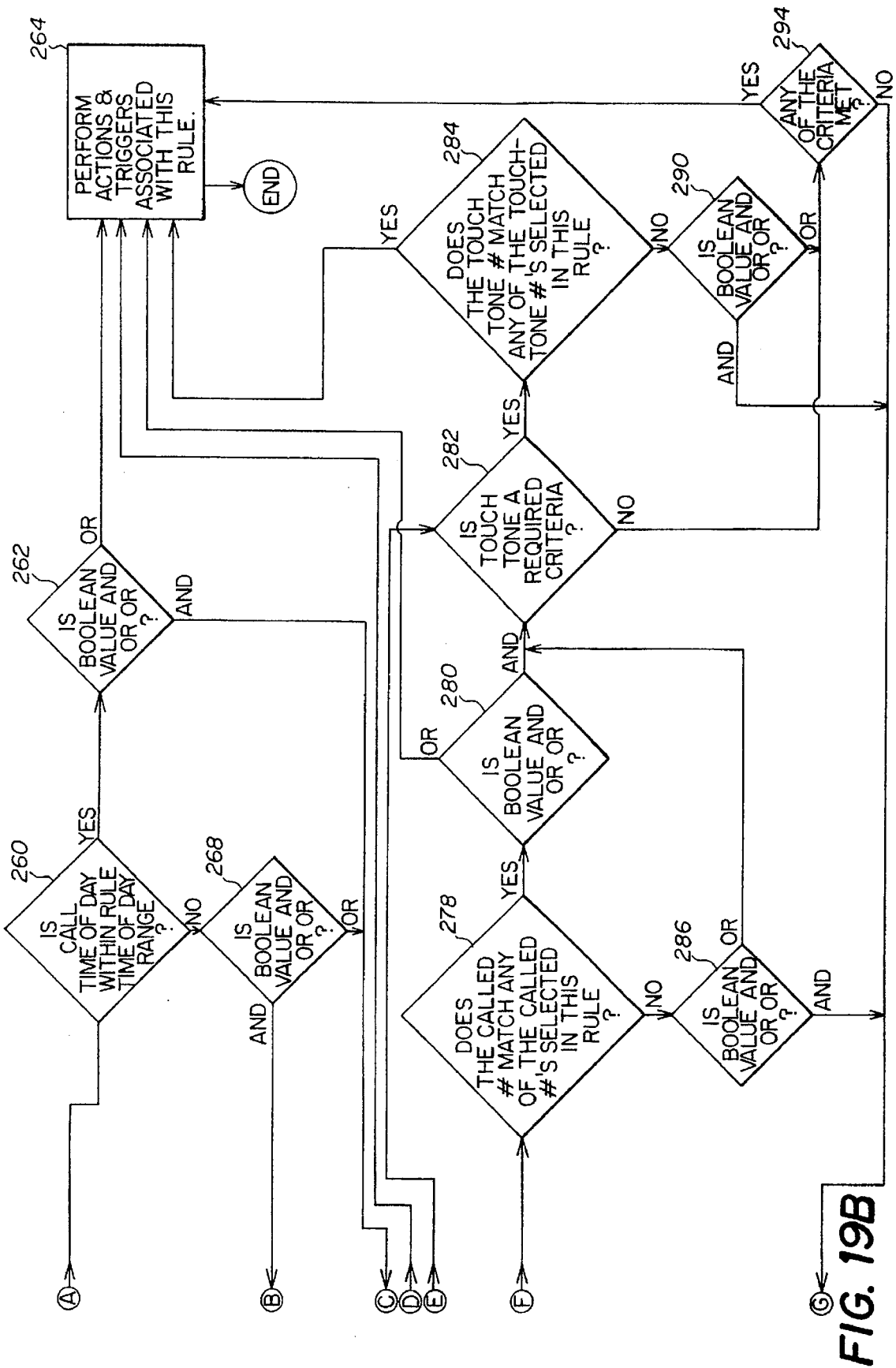

FIGS. 19A and 19B provide more detail on how the incoming call rules process works. In step 250 the incoming call is received and detected in the software of the invention. Call information associated with the call is listed in box 252. In step 254, the software loop counter is set to 1, which means to search the rules in priority order, to find a match with the current incoming call, with rule number 1 corresponding to the highest priority rule, rule number 2 being the second highest priority, etc. In step 256, the process to match the call information against the next rule's criteria is begun. The criteria consists of a boolean expression of zero or more the following elements: time of day, calling number, called number, and caller's touch tone input. The boolean expression can either be a logical AND of these elements, or a logical OR of these elements. Each rule can specify zero, one, two, three, or all four of the elements to be a required match, i.e. the time of day is a required part of the criteria, the calling number is a required part of the criteria, etc. If a logical AND is selected for the boolean expression, then all of the required criteria elements must contain a match to the current call for the rule to apply (i.e. match as a whole). If a logical OR is selected for the boolean expression, then if any of the required criteria elements match the current call, then the rule should apply.

The process of matching call criteria elements is described is steps 258–294. In step 258, the invention determines if the rule the call information is being matched again has time of day as a selected required criteria. If not, processing proceeds to the next criteria step 270. If time of day is a required element, then the current time is matched against the time of day range entered in the rule to determine if the current time falls within the range specified step 260. If it does not step 268 and the boolean expression setting is AND, the rule will not apply, and the program proceeds to the next loop counter (next highest priority rule) to see if there is a match, step 266. If there are not more rules, the program terminates and no action is taken. If the time range does not match and the boolean expression is OR, then the rule may still apply, so processing continues with matching the next criteria element (calling number) in step 270. If the current time does fall into the specified time range and the boolean expression setting is OR, then the rule is matched, step 264 and the multimedia actions specified in the rule are taken by the invention as described above. If the time range match and the boolean expression setting is AND, then the rule may apply, if other criteria are met, and processing continues with matching the next criteria element (calling number) in step 270.

In step 270, the invention determines whether the current rule specifies a calling number match as a selected criteria. If not, processing continues with matching the next element, called number, step 276. If calling number match is specified, then the current call calling number is matched against the list of selected telephone number identified with this rule, step 272. If there is a match of any of the selected calling number with the current calling number, step 274, then the boolean expression setting is examined. If it is set to OR, then the rule matches, and the multimedia actions for this rule are taken, step 264. If it is set to AND, then this rule may still apply, if all other criteria specified are met, and processing continues with the next element of the criteria (called number) in step 276. If there is no match between the calling numbers selected and the current calling number, step 292, then if the boolean expression setting is AND, this rule is not a match, and processing continues with the next rule, step 266. If the boolean expression is OR and there is no calling number match, then the rule may still be a match if any of the next criteria are a match and processing continues with matching called number is selected, step 276. The same processing for called number and caller touch tone input is done as is with calling number, in steps 276–284 to determined whether the rule is a match or not. If a match is found, the appropriate actions specified with the rule are taken. If no match is found, the appropriate actions specified with the rule are taken. If no match is found the next rule is examined (in priority order) for a match until no more enabled rules exist, step 266.

All calls go through the rule examination process when the call is first received, when the call is answered, upon user command, or a combination of these, as the user dictates. This provides the user with the ability to determine when and how call-related multimedia events will occur. This invention anticipates extensions to the criteria, boolean expression, and actions which may be specified in each rule. These actions include but are not limited to: popping up a screen or window of information; popping up multiple screens in a specified order; keystroke command emulation using call information or a translation of the information; inter-program communications, such as dynamic data exchange, and application linking; and other forms of scripted commands, potentially a built in call macro language that could launch applications search files for information, etc.

Uniform Configuration for Different Switching Devices

Not all telephone switching devices use the same communication protocols for common telephone functions such as "dial", "answer", "hangup", "hold", etc. Heretofore, the interface between the switching device and the users computer system would be hard ceded by those skilled in the computer science arts, but then the users computer-telephone integration system would be switch dependent.

According to this invention, however, a switching device independent state machine for handling the different communication protocols for different telephone switching devices is accomplished as follows.

FIGS. 20A-20D, 21A-21D, 22A-22B, and 23A-23D describe the State Machine of the invention. This State Machine is comprised of 11 states that a call (incoming or outgoing) may be in. The states are labeled 1 through 11 across the top of the figures. The columns in the body of the tables define the new state of a call that is currently in the state indicated at the top of the column. This state "S" may change based upon an event described on the lefthand side of the table. These events are one of two kinds: an event generated by and transmitted by the telephone switching device (FIGS. 20A-20D, 21A-21D, and 22A-22B) or actions requested by the user (FIGS. 23A-23D). These events are represented in the software of the invention by inter-program messages passed between the various software programs of the invention as shown in FIG. 13. The State Machine is embodied in MASTER CALL PROCESS program 54. When an event from the telephone switch occurs, it is first made known to the PHONE INTERFACE program 56, via telephone switch-dependent communications. The PHONE INTERFACE program 56 in turn notifies the MASTER CALL PROCESS program 54 via a uniform; i.e., switch-independent communication, so that the State Machine can perform the approximate actions and change states if required. When user request events occur, they are first received via the CALL CONTROL KEYS program 58; i.e., the user interface. CALL CONTROL KEYS program 58 in turn communicates the action requests to the MASTER CALL PROCESS 54 for handling and potentially for the transmission of commands to the telephone switching device to carry out the user requests. These commands would be sent by a uniform telephone switch, device-independent communications format from the MASTER CALL PROCESS 54 to the PHONE INTERFACE process 56, which would, depending upon the type of switching device, send one or more directives to carry out a telephone function request, such as hang up call, dial, etc.

Figure 20C:
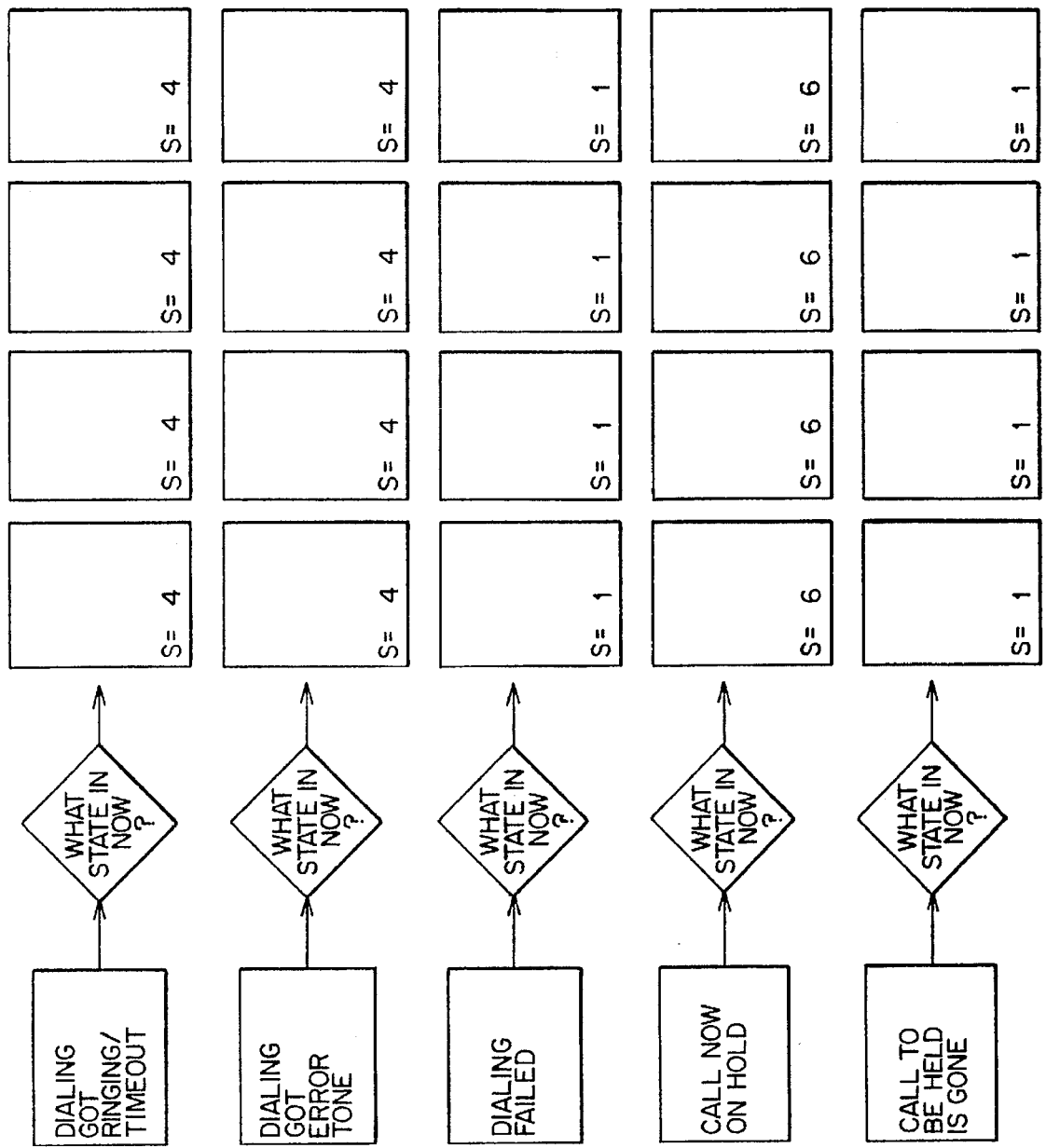
Figure 20D:
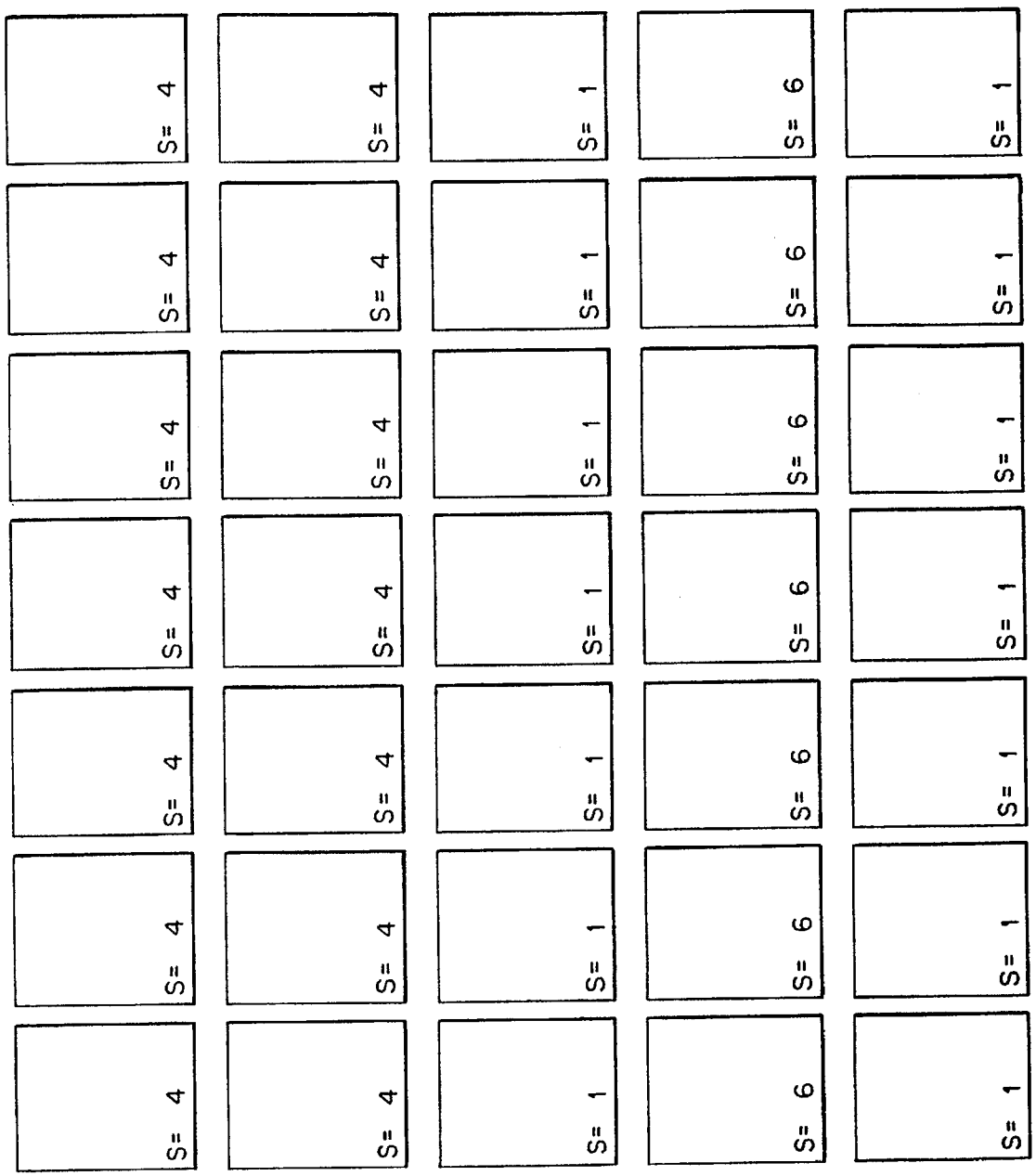
Figure 21C:
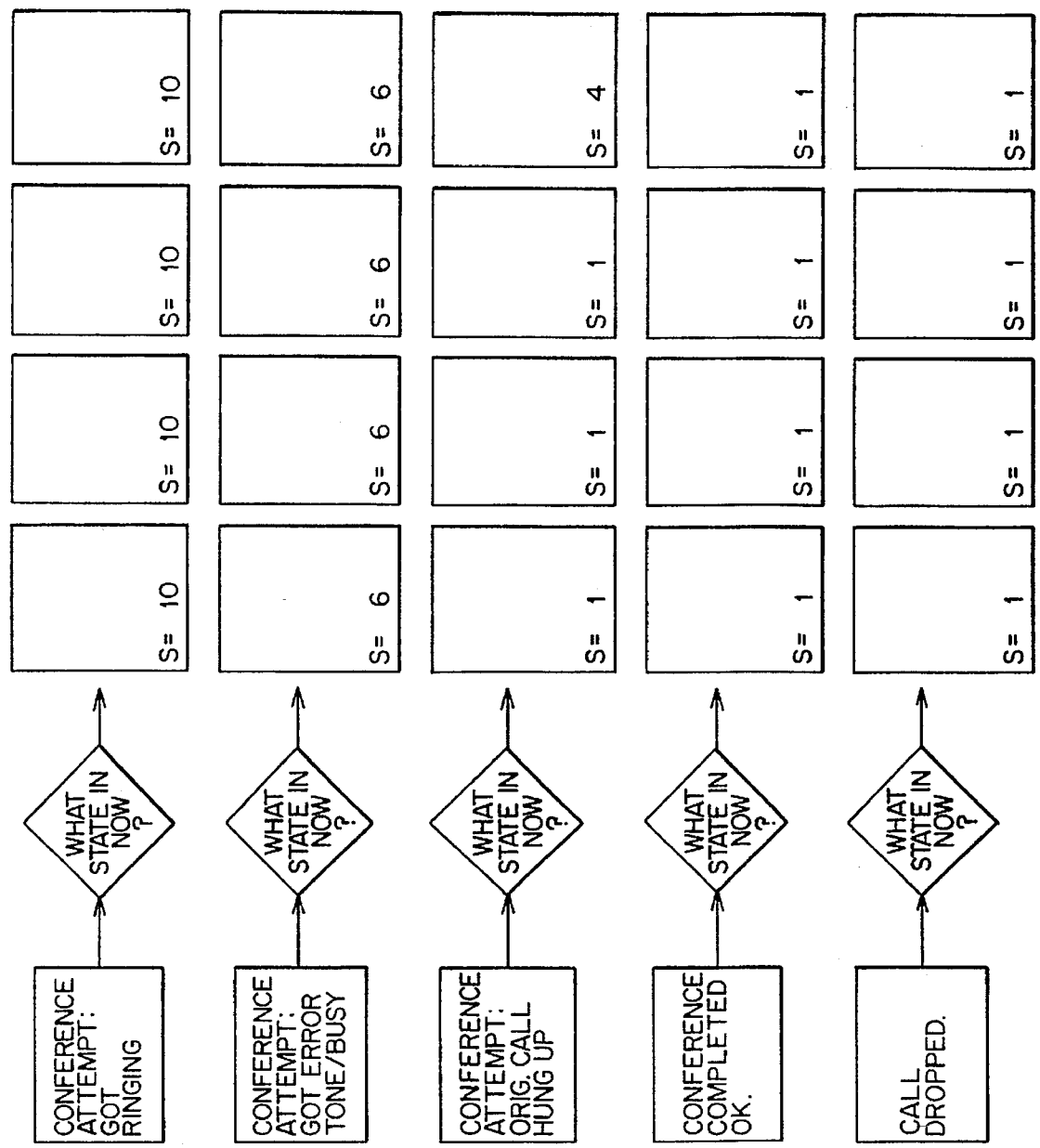
Figure 21D:
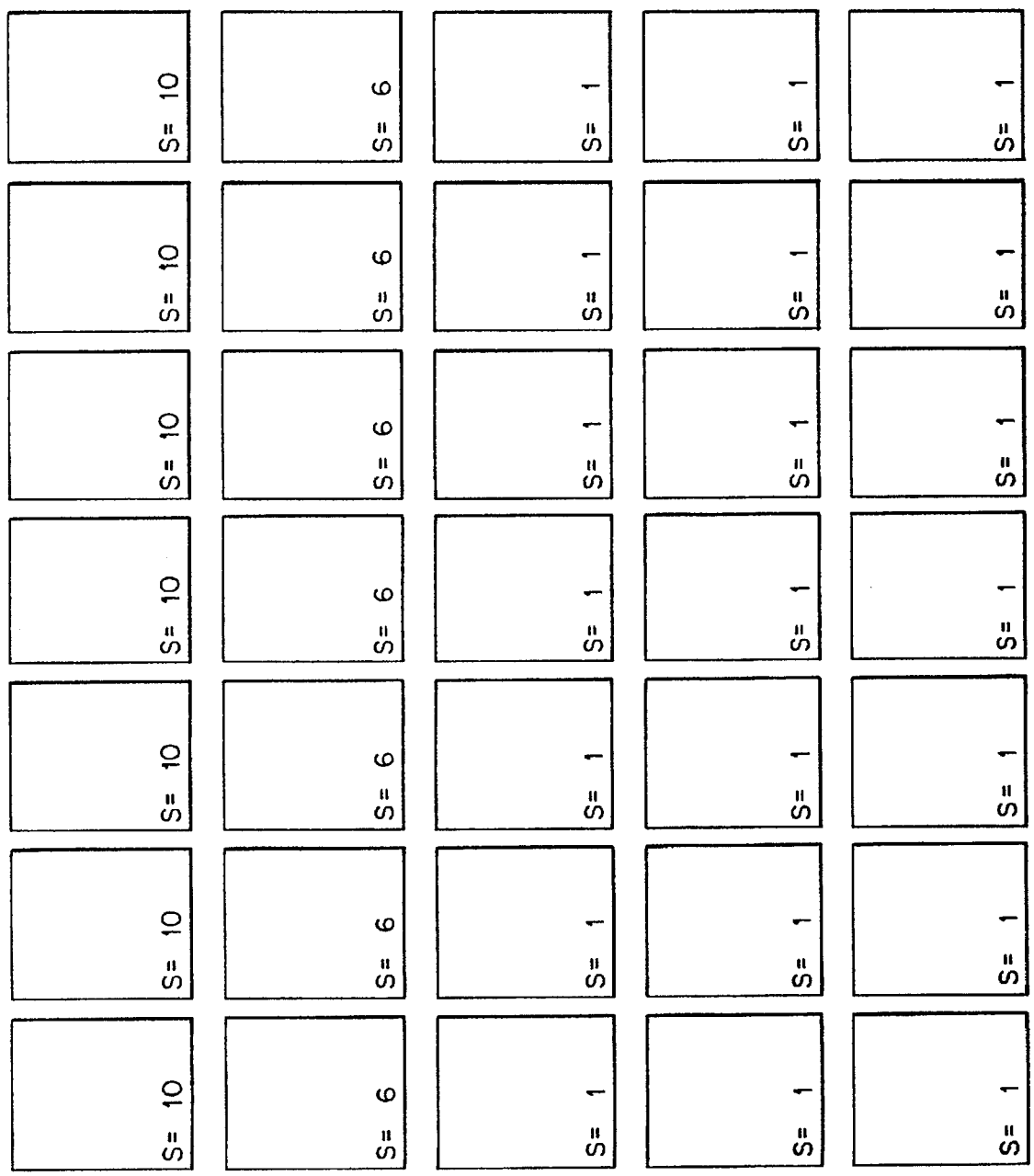
Figure 23C:
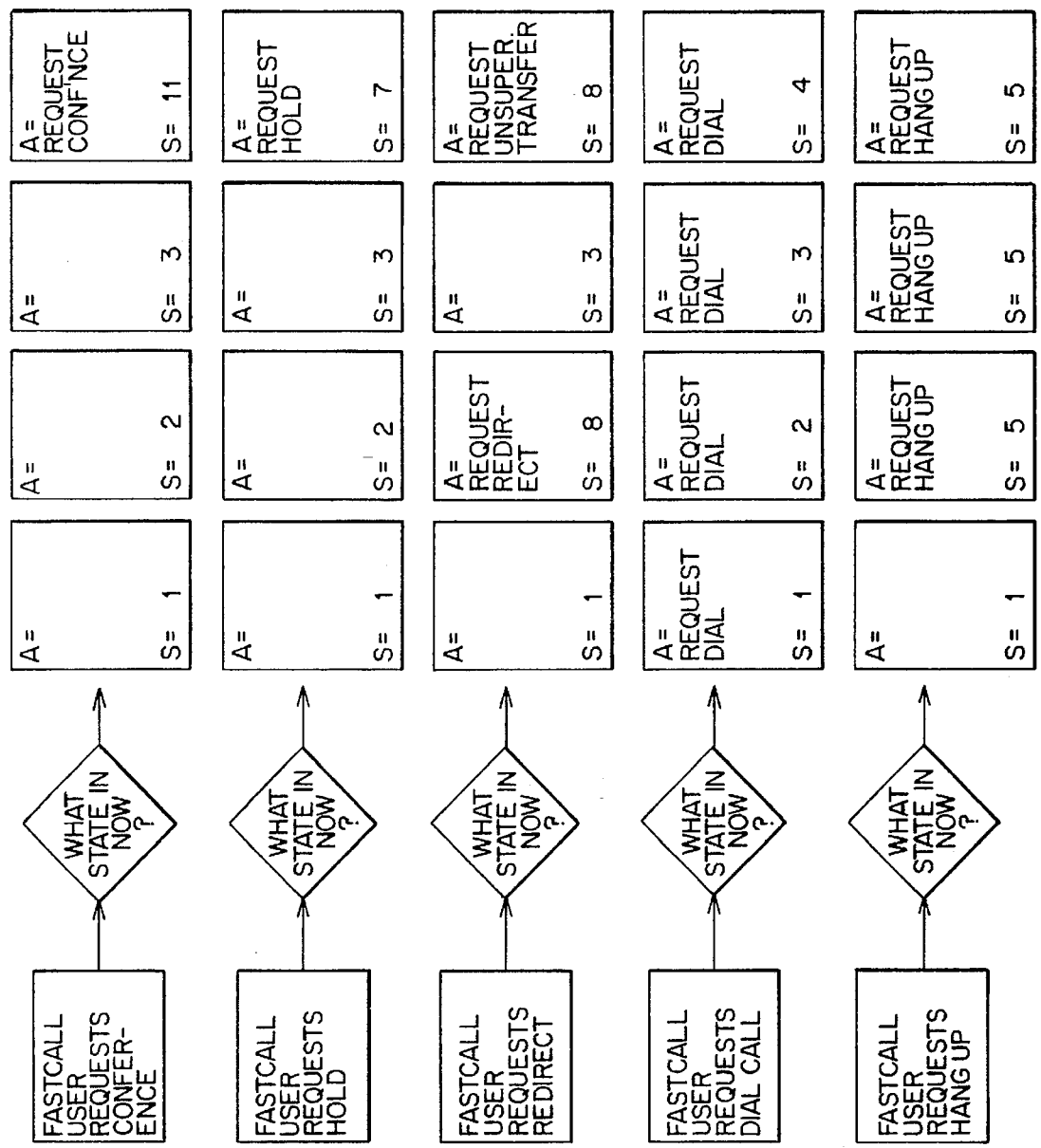

The uniform telephone switching device independent communications format between the MASTER CALL PROCESS 54 and the PHONE INTERFACE PROCESS 56 takes the shape of messages, which correspond to the events listed down the left hand side of FIGS. 20, 21, and 22. Each appearance on a telephone device may have events associated with it, and these events are translated into data messages sent from the PHONE INTERFACE PROCESS 56 to the MASTER CONTROL PROCESS 54. For example, when a new call comes to the telephone device, i.e. the telephone "rings", then the PHONE INTERFACE PROCESS 56 would detect this and send a "RINGING" message to the MASTER CALL PROCESS 54 for the appearance that is ringing. This is shown as the top event in FIGS. 20A-20D. The set of messages include the following, as indicated in FIGS. 20A-20D, 21A-21D, and 22A-22B, but are not limited to those below, as extended features of telephone device capabilities may be added to the state machine in the future, as new events and messages.

| | |
|---|---|
| RINGING | * Incoming call is arriving (ringing). |
| ANSWER(TRUE) | * Call has been answered successfully. |
| ANSWER(FALSE) | * Call was attempted to be answered, but the answer failed. |
| DIAL(RING) | * An outgoing call successfully received ringing on the far end or timed out after a configurable number of seconds |
| DIAL(TONE) | * An outgoing call resulted in a busy signal or other invalid tone on the far end |
| DIAL(FALSE) | * An outgoing call could not be placed |
| HOLD(TRUE) | * A call just successfully went on hold |
| HOLD(FALSE) | * A call that was attempted to be put on hold could not be put on hold because the far end party hung up |
| XFER(RING) | * A transferred call got ringing or a timeout on the far end (party to whom call wold be transferred) |
| XFER(TONE) | * A transferred call got a busy or invalid tone on the far end (party to whom call would be transferred) |
| XFER(FAIL) | * A transfer failed because the original connected party hung up |
| CONF(RING) | * A conference call got ringing or a timeout on the far end (party to whom call would be transferred) |
| CONF(TONE) | * A conference call got a busy or invalid tone on the far end (party to whom call would be transferred) |
| CONF(FAIL) | * A conference failed because the original connected party hung up |
| CONF(TRUE) | * A conference completed successfully |
| DROP(TRUE) | * The user hung up the telephone |
| NEWDISP() | * A new display is appearing on the telephone |
| CURRENT(APP) | * A new appearance is now the active appearance among the multiple appearances |
| REDIR(FALSE) | * An attempt to redirect a ringing call to another extension failed. |

The State Machine controls all of the "run time", i.e., call processing, activities of the invention, in the sense that each action taken by the invention is triggered by either a user request or an event transmitted by the telephone device. In other words, the run time portion of the invention is completely "event driven", and the actions that are taken based upon the event are embodied in the State Machine. The actions taken by the State Machine in the MASTER CALL PROCESS include various functions; such as, writing records to call logs, sending messages to programs to invoke triggers, pop-up application screens, place calls, etc. The communication between all programs within the invention is done in a uniform messaging scheme which is telephone switching device, and application independent. Telephone switching device dependent communications are strictly isolated to the one PHONE INTERFACE process 56, thereby providing the uniform product claimed herein.

There are three other process elements in the software of the invention shown in FIG. 13. Process 51 is the hot key management process. This includes the use of a "hook"

within the Windows environment that allows a hot key to be globally defined that will bring up the user interface of the invention (process 58) no matter what state or application the user may currently be in. This hot key may be specified within a defined list of choices given to the user. The hot key is used to toggle the state of the user interface. If the user interface is active, then the hot key will minimize the user interface to an ionized state. If the user interface is not active but visible, the hot key will make the user interface the active window for the user. If the user interface is in an ionized inactive state, then the hot key will restore the user interface window and make it the active user window.

Process 53 is the outbound call management process. This process is activated upon the entering of the outdialing "hot keys" by the user that signal the outbound call management process to extract call information, specifically a number to be dialed, from an application, and then to dial this number. The outbound call management process decides which application to extract the called number from, extracts the number, and then passes a dial request message to the Master Call Process (54) for actual placement of a call. The outbound call management process makes it decision on which application the information is to he taken from, based upon the fact that it is the last application that was active with the user prior to the hot key dialing request being initiated. The commands required to extract the telephone called number are retrieved form files configured (trained) earlier by the user for this particular application and current window, called outgoing call triggers). If the user requests a hot key dialing, and the last active window has no associated command file, the outbound call management process does not send any dial requests to the Master Call Process.

Process 55 is the incoming call management process. This process is responsible for running the rules matching algorithm specified in FIGS. 18, 19A and 19B. The incoming call management process is invoked at various times based upon the user's configuration. It may be invoked when incoming calls first arrive, upon the user answering the call, whether call information changes, or upon user demand.

There are four other library elements and one module in the software of the invention described in FIG. 13. Library 57 is the hot key library. It contains the functions to enable or disable a new hot key as the key that will activate and deactivate the user interface. Library 59 is the keystroke macro library. This library contains the functions required for the user to record and playback computer keystroke commands that are associated with incoming and outgoing call triggers. Library 60 is the log file library. It contains the functions that read and write call records to call log file, so that a user can retrieve a history of the calls placed or received. Library 61 is the interprogram data passing library. It contains the functions that create data elements that are passed among the various modules within the invention. These data elements typically include basic call information such as the calling number, called number, telephone display characters, etc.

Module 62 is a timer configuration file that specifies timing values specifies timing values specific to telephone call processing. This file allows the invention to change how it reacts to error conditions in the telephone device. For example, if a call is placed, but no ringing or busy tone is ever detected by the telephone device, the invention will "time out" and assume the call is completed after a certain number of seconds, specified in this configuration file. The adjustment of these time values allows for a variety of performance conditions for the user, depending upon how the user wants the system to react under such error conditions.

Although specific features of the invention are shown in some drawings and not others, this is for convenience only as some features may be combined with any or all of the other features in accordance with the invention.

Other embodiments will occur to those skilled in the art and are within the following claims:

What is claimed is:

1. A computer telephone integration system comprising
    a telephone interface to a telephone system that extracts call information from the telephone system;
    a computer integrated with said telephone interface, the computer having a plurality of independent application programs that are operable on the computer and having data that is retrievable by any one of the plurality of independent application programs;
    a call processor means, operable on said computer and responsive to the call information received by the computer from the telephone interface at the reception of an incoming call or to call information provided by a user at an initiation of an outgoing call, for uniformly establishing first commands for retrieving and tunning any one of said independent application programs and second commands for retrieving data associated with the any one of the independent application programs;
    a means for associating the first commands end the second commands with said call information; and
    a means for automatically executing the first commands and the second commands in response to receipt of said call information.

2. The computer telephone integration system of claim 1, wherein the call processor means further includes a means for establishing a window for the any one of the independent application programs to be run in and for the data associated with the any one of the independent application programs to be retrieved and displayed in.

3. The computer telephone integration system of claim 1, wherein the means for automatically executing includes a means for inserting the call information into the second commands to retrieve the data associated with the any one of the independent application programs.

4. The computer telephone integration system of claim 1 in which said means for associating includes a means for uniformly establishing precedential rules for handling the incoming call or the outgoing call, each precedential rule having criteria which the call information must meet before said precedential rule is executed and each rule having an action to be taken if the call information meets the criteria.

5. The computer telephone integration system of claim 4, wherein the means for uniformly establishing the precedential rules includes a means for entering the criteria and for entering the action to be taken.

6. The computer telephone integration system of claim 4 in which said criteria include at least one of a calling party's number, a called party's number, time of day information, and DTMF information.

7. The computer telephone integration system of claim 4, in which said means for uniformly establishing precedential rules includes a means for denoting an order of priority for evaluating the precedential rules.

8. The computer telephone integration system of claim 4 in which said call processor means includes a means for analyzing which rule criteria are met by the call information.

9. The computer telephone integration system of claim 8, in which one action of said precedential rules is to accept the incoming call received by the computer when the call information received by the computer at the reception of the incoming call meets the criteria of the rule.

10. The computer telephone integration system of claim 8, in which one action of said precedential rules is to forward the incoming call received by the computer to a predefined destination, when the call information received by the computer at the reception of the incoming call meets the criteria of the rule.

11. A system for uniformly establishing a call handling system on a computer integrated with a telephone system, comprising:

a call processor means, operable on the computer and responsive to call information, for uniformly establishing first commands for retrieving and running any one of a plurality of independent application programs that are operable on the computer, and for uniformly establishing second commands for retrieving data associated with the any one of the independent application programs;

a means for associating the first commands and the second commands with the call information received by the computer from the telephone system at the reception of an incoming call or provided by a user at the initiation of an outgoing call; and a means for automatically executing the first commands and the second commands upon receipt of the call information.

12. The system of claim 11, in which the means for associating includes a means for uniformly establishing precedential rules for handling the incoming call or the outgoing call, each precedential rule having criteria which the call information must meet before the precedential rule is executed and each rule having an action to be taken if the call information meets the criteria.

13. The system of claim 12, in which said means for uniformly establishing precedential rules further includes a means for assigning an order of priority for evaluating said precedential rules.

14. The system of claim 13 further including a means for establishing the criteria for each rule of said precedential rules.

15. The system claim 14, wherein the criteria include at least one of a calling party's number, a called party's number, time of day information, and DTMF information.

16. The system of claim 14 further including a means for detecting an incoming call from said telephone system and for extracting said call information from the incoming call.

17. The system of claim 16, wherein one action of the precedential rules is to accept the incoming call from the telephone system when the call information received from the telephone system meets the criteria of the rule.

18. The system of claim 16, wherein one action of the precedential rules is to forward the incoming call received from the telephone system to a predefined destination when the call information received from the telephone system meets the criteria of the rule.

19. The system of claim 14, further including a means for analyzing which rule criteria are met by the call information.

20. A method of establishing a computer telephone integration system comprising the steps of:

providing a computer integrated with a telephone system, the computer having a plurality of independent application programs operable thereon, and having data that is retrievable by any one of the plurality of independent application programs;

receiving, with the computer, call information provided by a user at the initiation of an outgoing call or call information from said telephone system at the reception of an incoming call;

uniformly establishing and storing on said computer first commands for retrieving and running at least one independent application program of said plurality of independent application programs and second commands for retrieving data associated with the at least one independent application program;

associating the first commands and the second commands with said call information; and automatically executing the first commands and the second commands in response to receiving said call information.

21. The method of claim 20, wherein the step of automatically executing includes providing a window to run the application program in and to display the data retrieved with the application program.

22. The method of claim 20, wherein the step of automatically executing includes inserting the call information in the second commands to retrieve the data associated with the application program.

23. The method of claim 20 further including the step of establishing precedential rules for handling the incoming call and the outgoing call including criteria which the call information must meet before the rules are executed.

24. The method of claim 23 in which the step of establishing precedential rules includes the step of denoting at least one of a calling party's number, a called party's number, time of day information, and DTMF information.

25. The method of claim 23, further including the step of analyzing which rule criteria are met by the call information.

26. The method of claim 25, wherein the step of analyzing includes analyzing the rule criteria in an order of priority.

27. The method of claim 23, further including the step of accepting an incoming call received from said telephone system when the call information meets the criteria.

28. The method of claim 23, further including the step of transferring an incoming call received from said telephone system to a predefined destination when the call information meets the criteria.

29. A method for uniformly establishing a system for call handling on a computer integrated with a telephone system, the method comprising the steps of:

uniformly establishing and storing on the computer first commands for retrieving and running any one of a plurality of independent application programs operable on the computer, and second commands for retrieving data associated with the any one of the plurality of independent application programs;

associating the first commands and the second commands with call information received by the computer from the telephone system at the reception of an incoming call or provided by a user at the initiation of an outgoing call; and automatically executing the first commands and the second commands upon receipt of the call information.

30. The method of claim 29, further comprising the step of establishing precedential rules for handling the incoming call and the outgoing call including entering and storing the precedential rules on the computer in an order of priority.

31. The method of claim 30 wherein the step of establishing the precedential rules includes the step of entering and storing criteria which the call information must meet before a precedential rule is invoked.

32. The method of claim 31, wherein the step of establishing the precedential rules includes the step of entering and storing an action to be taken if said criteria is met and said precedential rule is invoked.

33. The method of claim 32 in which the step of automatically executing includes the step of extracting said call information from said incoming call.

34. The method of claim 33 in which the step of automatically executing further includes the step of searching through said stored rules in the order of priority until the criteria of the call information matches the criteria of said rule.

* * * * *